US012737591B2

(12) United States Patent
Imoto

(10) Patent No.: US 12,737,591 B2
(45) Date of Patent: Sep. 15, 2026

(54) PREDICTION DEVICE

(71) Applicant: Murata Machinery, Ltd., Kyoto (JP)

(72) Inventor: Shinichiro Imoto, Ise (JP)

(73) Assignee: Murata Machinery, Ltd., Kyoto (JP)

( * ) Notice: Subject to any disclaimer, the term of this patent is extended or adjusted under 35 U.S.C. 154(b) by 404 days.

(21) Appl. No.: 18/562,384

(22) PCT Filed: Feb. 3, 2022

(86) PCT No.: PCT/JP2022/004203
§ 371 (c)(1),
(2) Date: Nov. 20, 2023

(87) PCT Pub. No.: WO2022/249551
PCT Pub. Date: Dec. 1, 2022

(65) Prior Publication Data

US 2024/0242063 A1 Jul. 18, 2024

(30) Foreign Application Priority Data

May 28, 2021 (JP) ................................ 2021-089952

(51) Int. Cl.
*G06N 3/045* (2023.01)

(52) U.S. Cl.
CPC .................................. *G06N 3/045* (2023.01)

(58) Field of Classification Search
None
See application file for complete search history.

(56) References Cited

U.S. PATENT DOCUMENTS

2019/0228329 A1 7/2019 Utsumi et al.
2020/0379466 A1* 12/2020 Kitamura .............. G06N 20/00
(Continued)

FOREIGN PATENT DOCUMENTS

CN 109859516 A 6/2019
CN 111256723 A 6/2020
(Continued)

OTHER PUBLICATIONS

English Machine translation of the International Preliminary Report on Patentability and Written Opinion dated Dec. 7, 2023, of counterpart International Application No. PCT/JP2022/004203.
(Continued)

*Primary Examiner* — Nam D Pham
(74) *Attorney, Agent, or Firm* — DLA Piper LLP (US)

(57) ABSTRACT

A prediction device include: a storage unit storing a prediction model trained by machine-learning to receive the input data and output the output data, the input data being based on log information of a plurality of conveyance vehicles during a first period prior to a reference point in time, the output data indicating a prediction result of a degree of increase or decrease in the number of conveyance vehicles in a target area during a second period subsequent to the reference point in time; an acquisition unit acquiring data for prediction, based on the log information during a past period prior to a prediction execution point in time; and a prediction unit acquiring prediction information indicating a prediction result of a degree of increase or decrease in the number of conveyance vehicles in the target area during a future period by entering the data for prediction into the prediction model.

16 Claims, 15 Drawing Sheets

(56) References Cited

U.S. PATENT DOCUMENTS

| | | | |
|---|---|---|---|
| 2021/0182702 | A1 | 6/2021 | Ito et al. |
| 2022/0020502 | A1 | 1/2022 | Kim et al. |

FOREIGN PATENT DOCUMENTS

| | | | |
|---|---|---|---|
| JP | 2010-282567 | A | 12/2010 |
| JP | 2018-163515 | A | 10/2018 |
| JP | 2020-86650 | A | 6/2020 |
| JP | 2020-194345 | A | 12/2020 |
| WO | 2019/087526 | A1 | 5/2019 |

OTHER PUBLICATIONS

International Search Report dated Apr. 12, 2022 in counterpart International Application No. PCT/JP2022/004203 w/English translation.

Written Opinion dated Apr. 12, 2022 in counterpart International Application No. PCT/JP2022/004203.

* cited by examiner 1
2 : CONVEYANCE VEHICLE
7 : PROCESSING DEVICE
8 : STOCKER
9 : JOINING PART
6(4)
5(4)
M 3
MES
1
CONVEYANCE VEHICLE SYSTEM
11
MCS
12
CONVEYANCE VEHICLE CONTROLLER
2
CONVEYANCE VEHICLE
2
CONVEYANCE VEHICLE
13
LOG DB
20
PREDICTION DEVICE
23
ACQUISITION UNIT
24
PREDICTION UNIT
22
30
PREDICTION MODEL
21
MODEL GENERATION UNIT

*Fig. 3(A)*

| CONVEYANCE VEHICLE ID | COMMAND EXECUTION START TIME | From PORT ARRIVAL TIME | CONVEYANCE COMPLETION TIME | From PORT AREA NAME | To PORT AREA NAME |
|---|---|---|---|---|---|
| ... | ... | ... | ... | ... | ... |

*Fig. 3(B)*

| TIME STAMP | CONVEYANCE VEHICLE ID | AREA NAME | PLANNED TRANSIT AREA |
|---|---|---|---|
| ... | ... | ... | ... |

Fig.6

| DATA NAME | DESCRIPTION | LOG USED TO OBTAIN DATA |
|---|---|---|
| Mx_VHL | NUMBER OF CONVEYANCE VEHICLES TRAVELING IN TARGET AREA | CONVEYANCE VEHICLE INFORMATION LOG |
| Mx_Fm | NUMBER OF CONVEYANCE VEHICLES TRAVELING TO From PORT IN TARGET AREA | CONVEYANCE COMMAND LOG |
| Mx_To | NUMBER OF CONVEYANCE VEHICLES TRAVELING TO To PORT IN TARGET AREA | |
| Mx_Dec | NUMBER OF CONVEYANCE VEHICLES TRAVELING TO To PORT IN ANOTHER AREA, AFTER LOADING ARTICLE IN TARGET AREA<br>+<br>NUMBER OF CONVEYANCE VEHICLES TRAVELING TO From PORT IN ANOTHER AREA, AFTER GOING AROUND OR WAITING IN TARGET AREA | CONVEYANCE COMMAND LOG<br>CONVEYANCE VEHICLE INFORMATION LOG |
| Mx_Inc | NUMBER OF CONVEYANCE VEHICLES TRAVELING TO SPECIFIC POINT IN TARGET AREA | CONVEYANCE COMMAND LOG |

Fig.8

| DATA NAME | DESCRIPTION | LOG USED TO OBTAIN DATA |
|---|---|---|
| Mx_Inc1 | NUMBER OF CONVEYANCE VEHICLES TRAVELING TO TARGET AREA FROM ANOTHER AREA SEPARATED FROM TARGET AREA BY ONE AREA | CONVEYANCE COMMAND LOG<br>CONVEYANCE VEHICLE INFORMATION LOG |
| Mx_Inc2 | NUMBER OF CONVEYANCE VEHICLES TRAVELING TO TARGET AREA FROM ANOTHER AREA SEPARATED FROM TARGET AREA BY TWO AREAS | |
| Mx_Inc3 | NUMBER OF CONVEYANCE VEHICLES TRAVELING TO TARGET AREA FROM ANOTHER AREA SEPARATED FROM TARGET AREA BY THREE AREAS | |
| ... | ... | |
| Mx_Spd1 | AVERAGE SPEED OF CONVEYANCE VEHICLES SUMMED UP IN Mx_Inc1 | |
| Mx_Spd2 | AVERAGE SPEED OF CONVEYANCE VEHICLES SUMMED UP IN Mx_Inc2 | |
| Mx_Spd3 | AVERAGE SPEED OF CONVEYANCE VEHICLES SUMMED UP IN Mx_Inc3 | |
| ... | ... | |

Fig.10

| LEVEL | CONDITIONS |
| --- | --- |
| Lv.4 | $n+N <$ AVERAGE NUMBER OF CONVEYANCE VEHICLES $\leqq N_{max}$ |
| Lv.3 | $n <$ AVERAGE NUMBER OF CONVEYANCE VEHICLES $\leqq n+N$ |
| Lv.2 | $n-N <$ AVERAGE NUMBER OF CONVEYANCE VEHICLES $\leqq n$ |
| Lv.1 | $0 \leqq$ AVERAGE NUMBER OF CONVEYANCE VEHICLES $\leqq n-N$ |

*Fig.11*

| TIME ZONE | Mon (w9) | ⋯ | Sun (w10) | Mon (w10) |
|---|---|---|---|---|
| 0:00 ~ 6:00 | M0-Mon9_1.h5 | ⋯ | M0-Mon10_1.h5 | M0-Mon10_1.h5 |
| 6:00 ~ 12:00 | M1-Mon9_1.h5 | ⋯ | M1-Mon10_1.h5 | — |
| 12:00 ~ 18:00 | M2-Mon9_1.h5 | ⋯ | M2-Mon10_1.h5 | — |
| 18:00 ~ 24:00 | M3-Mon9_1.h5 | ⋯ | M3-Mon10_1.h5 | — |

PREDICTION DEVICE

TECHNICAL FIELD

This disclosure relates to a prediction device that predicts the future state of a conveyance system.

BACKGROUND

Conventionally, for example, in semiconductor manufacturing plants and the like, a conveyance system for controlling the travel of a conveyance vehicle that conveys an article such as a cassette in which semiconductor wafers are stored has been known (see Japanese Unexamined Patent Publication No. 2010-282567). In such a conveyance system, a conveyance vehicle controller assigns a conveyance vehicle a transport command including information on the article to be conveyed, the picking up location (From point), and the unloading location (To point). Consequently, articles can be conveyed by the conveyance vehicle. For example, JP '567 discloses a method of predicting the occurrence of traffic congestion on the basis of the occurrence of an event relating to a delay in the conveyance operation performed by conveyance vehicles.

In the method described in JP '567, the traffic congestion is predicted as a result of the occurrence of a predefined event relating to a delay in the conveyance operation performed by conveyance vehicles. Therefore, it is not possible to predict the degree of future traffic congestion, in a state where such event has not yet occurred. On the other hand, prediction information on the degree of traffic congestion in a conveyance system is useful to perform the desired conveyance control (for example, selection of a conveyance vehicle to which a transport command is to be assigned, selection of a travel route of the conveyance vehicle and the like). Hence, there is a need to easily obtain such prediction information at any given timing.

It could therefore be helpful to provide a prediction device that can easily predict the degree of future traffic congestion in a conveyance system at any given timing.

SUMMARY

A prediction device is configured to predict a future state of a predetermined target area in a conveyance system that includes a conveyance path divided into a plurality of areas, a plurality of conveyance vehicles configured to convey an article by traveling along the conveyance path, and a conveyance vehicle controller configured to assign a transport command to each of the conveyance vehicles. The prediction device includes a storage unit configured to store a prediction model that is trained by machine-learning to receive input data and output data, the input data being based on log information on at least one of an assignment state of the transport command and the positions of the conveyance vehicles during a first period that is prior to a predetermined reference point in time, the output data indicating a prediction result of a degree of increase or decrease in the number of conveyance vehicles in the target area during a second period that is subsequent to the reference point in time; an acquisition unit configured to acquire data for prediction corresponding to the input data, based on the log information during a past period prior to a prediction execution point in time and has the same length as that of the first period; and a prediction unit configured to acquire prediction information by entering the data for prediction acquired by the acquisition unit into the prediction model, the acquired prediction information indicating a prediction result of a degree of increase or decrease in the number of conveyance vehicles in the target area during a future period that is subsequent to the prediction execution point in time and has the same length as that of the second period.

The prediction device prepares a prediction model configured to enter input data based on log information (information on at least one of the assignment state of the transport command and the positions of the conveyance vehicles) during the first period and output data indicating the prediction results of the degree of increase or decrease in the number of conveyance vehicles in the target area during the second period. Consequently, at any prediction execution point in time, it is possible to obtain the prediction results of the degree of increase or decrease in the number of conveyance vehicles in the target area during the future period that is subsequent to the prediction execution point in time, by just entering the data for prediction obtained from the log information during the past period that is prior to the prediction execution point in time, into the prediction model. Therefore, with the prediction device, it is possible to easily predict the degree of future traffic congestion in the conveyance system at any given timing.

The input data may include data indicating the number of first conveyance vehicles observed during the first period, the data for prediction may include data indicating the number of first conveyance vehicles observed during the past period, and the first conveyance vehicle may be the conveyance vehicle located in the target area. Thus, it is possible to accurately predict the degree of increase or decrease in the number of conveyance vehicles in the target area during the future period, while taking into account the number of conveyance vehicles located in the target area during the past period.

The input data may include data indicating the number of second conveyance vehicles observed during the first period, the data for prediction may include data indicating the number of second conveyance vehicles observed during the past period, and the second conveyance vehicle may be the conveyance vehicle traveling to a loading location in the target area on the basis of the transport command. Thus, it is possible to accurately predict the degree of increase or decrease in the number of conveyance vehicles in the target area during the future period, while taking into account the number of conveyance vehicles traveling to the loading location in the target area during the past period.

The input data may include data indicating the number of third conveyance vehicles observed during the first period, the data for prediction may include data indicating the number of third conveyance vehicles observed during the past period, and the third conveyance vehicle may be the conveyance vehicle traveling to an unloading location in the target area on the basis of the transport command. Thus, it is possible to accurately predict the degree of increase or decrease in the number of conveyance vehicles in the target area during the future period, while taking into account the number of conveyance vehicles traveling to the unloading location in the target area during the past period.

The input data may include data indicating the number of fourth conveyance vehicles observed during the first period, the data for prediction may include data indicating the number of fourth conveyance vehicles observed during the past period, and the fourth conveyance vehicle may be the conveyance vehicle traveling to another area from the target area. Thus, it is possible to accurately predict the degree of increase or decrease in the number of conveyance vehicles in the target area during the future period, while taking into account the number of conveyance vehicles traveling to another area from the target area during the past period.

The input data may include data indicating the number of fifth conveyance vehicles observed during the first period, the data for prediction may include data indicating the number of fifth conveyance vehicles observed during the past period, and the fifth conveyance vehicle may be the conveyance vehicle traveling to a specific point in the target area on the basis of the transport command. Thus, it is possible to accurately predict the degree of increase or decrease in the number of conveyance vehicles in the target area during the future period, while taking into account the number of conveyance vehicles traveling to a specific point in the target area during the past period.

The input data and the data for prediction may include data indicating the number of conveyance vehicles for each degree of proximity between the area in which the fifth conveyance vehicles are traveling and the target area, the number of conveyance vehicles being obtained by summing up the fifth conveyance vehicles for each degree of the proximity. Thus, it is possible to more accurately predict the degree of increase or decrease in the number of conveyance vehicles in the target area during the future period, while taking into account the difference in the degree of influence on the number of conveyance vehicles in the target area by the degree of proximity to the target area.

The input data and the data for prediction may further include data on the speed of the fifth conveyance vehicle. Thus, it is possible to add information that can be used as clues for the period during which the number of conveyance vehicles in the target area is expected to increase by the inflow of the fifth conveyance vehicles, to the input data. As a result, it is possible to more accurately predict the degree of increase or decrease in the number of conveyance vehicles in the target area during the future period.

The prediction device described above may further include a model generation unit that generates a prediction model. The model generation unit may generate a plurality of pieces of teacher data including input data during the first period and a correct answer label indicating the degree of increase or decrease in the number of conveyance vehicles in the target area during the second period, by using each of a plurality of points in time different from each other as the reference point in time. The model generation unit may then generate the prediction model by performing machine leaning using the generated pieces of teacher data. Thus, the model generation unit can appropriately generate the prediction model to be used for a prediction process.

By using the number of conveyance vehicles in the target area at the reference point in time as a reference value, the model generation unit may set a plurality of levels according to the degree of increase or decrease in the number of conveyance vehicles from the reference value. Also, by using a plurality of points in time different from each other as the reference points in time, the model generation unit may generate a plurality of pieces of teacher data including the input data during the first period and a correct answer label indicating the level to which the average number of conveyance vehicles in the target area during the second period belongs. Using the number conveyance vehicles in the target area at the prediction execution point in time as the reference value, the prediction unit may acquire information as the prediction information by entering the data for prediction into the prediction model, the acquired information indicating the prediction results of the level to which the average number of conveyance vehicles in the target area during the future period belongs. Thus, based on the number of conveyance vehicles in the target area at the prediction execution point in time, it is possible to easily recognize whether the number of conveyance vehicles in the target area is in the direction of increase or in the direction of decrease, on the basis of the prediction results of the level.

The model generation unit may divide the second period into a plurality of subperiods along a time series. Also, by using a plurality of points in time different from each other as reference points in time, the model generation unit may generate a plurality of pieces of teacher data including the input data during the first period and a correct answer label indicating the level to which the average number of conveyance vehicles in the target area in each of the subperiods belongs. The prediction unit may acquire information as the prediction information by entering the data for prediction into the prediction model, the acquired information indicating the prediction results of the level to which the average number of conveyance vehicles in the target area in each of the sub-periods included in the future period belongs. Thus, it is possible to obtain the prediction results of the level for each sub-period included in the future period. Hence, it is possible to predict the transition tendency of the future number of conveyance vehicles in the target area (for example, any one of the tendency to keep increasing, tendency to keep decreasing, tendency to increase after a decrease, tendency to decrease after an increase and the like).

The model generation unit may be configured to generate a prediction model for each predetermined learning execution cycle. The model generation unit may generate a plurality of pieces of teacher data by using a plurality of points in time included in the target period from the generation timing of the previous prediction model to the generation timing of the current prediction model as the reference points in time. The model generation unit may then generate the current prediction model by performing machine learning using the generated pieces of teacher data. The storage unit may store the current prediction model generated by the model generation unit in association with the target period, without deleting the prediction model generated in the past by the model generation unit. Thus, it is possible to generate and store a prediction model according to the characteristics of the target period (such as the operation status of the conveyance system) for each target period. Consequently, it is possible to obtain various prediction models that can be used for prediction.

The prediction unit may be configured to be able to select any prediction model to be used for prediction, from a plurality of the prediction models stored in the storage unit.

The prediction unit may select a prediction model associated with the most recent target period, from the prediction models stored in the storage unit. Thus, by performing prediction using the latest prediction model generated for the most recent target period, it is possible to perform accurate prediction when the operation status the same as that of the most recent time zone will most likely continue or the like.

The prediction unit may select the prediction model associated with the past target period corresponding to the period including the prediction execution point in time, from the prediction models stored in the storage unit. Thus, by performing prediction using the prediction model associated with the past target period corresponding to the period including the prediction execution point in time, it is possible to perform accurate prediction when day periodicity (for example, the tendency in which the operation status of the conveyance system becomes substantially the same when the day and time zone are the same) is high and the like.

The prediction unit may acquire prediction information by performing a prediction process using the prediction model and notify the conveyance vehicle controller of the prediction information, for each prediction execution cycle that is shorter than the second period. Thus, it is possible to allow the conveyance vehicle controller to always recognize the prediction results relating to the number of conveyance vehicles in the target area. As a result, it is possible to allow the conveyance vehicle controller to continuously perform the desired conveyance control (for example, at least one of the selection of the conveyance vehicle to which a transport command is assigned, selection of the travel route of the conveyance vehicle and the like) in which the prediction results are taken into account.

It is thus possible to provide a prediction device that can easily predict the degree of future traffic congestion in a conveyance system at any given timing.

BRIEF DESCRIPTION OF THE DRAWINGS

FIG. 3(A) is a diagram illustrating an example of a transport command log, and FIG. 3(B) is a diagram illustrating an example of a conveyance vehicle information log.

FIG. 6 is a diagram illustrating an example of input data.

FIG. 8 is a diagram illustrating another example of input data.

FIG. 10 is a diagram illustrating an example of levels.

FIG. 11 is a diagram illustrating an example of a plurality of prediction models stored in a storage unit.

REFERENCE SIGNS LIST

Figure 1:
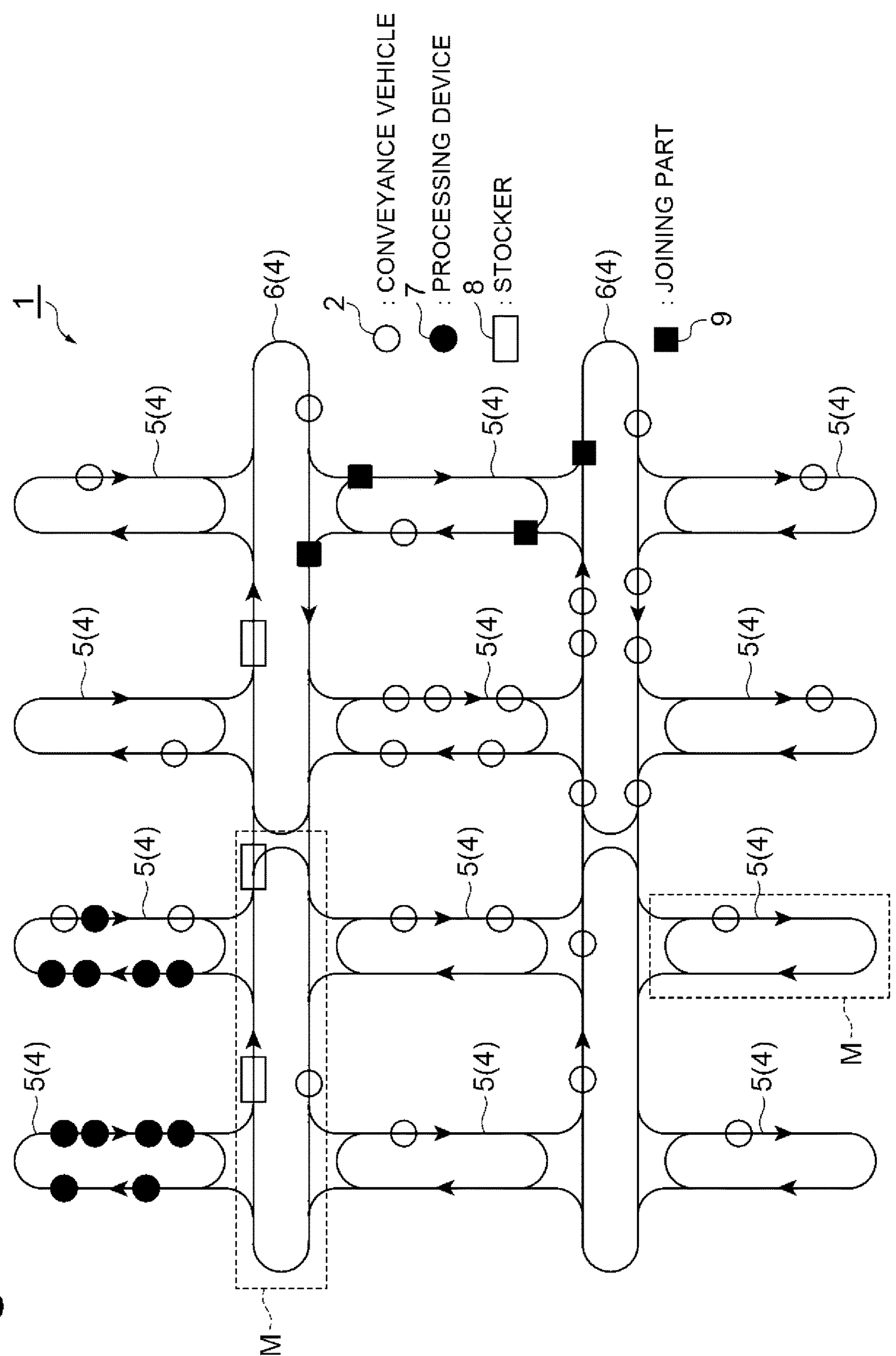
FIG. 1 is a diagram illustrating an example of a layout of a conveyance system.

1 conveyance system
2, 2*a* to 2*o* conveyance vehicle
4 conveyance path
12 conveyance vehicle controller
20 prediction device
21 model generation unit
22 storage unit
23 acquisition unit
24 prediction unit
25 prediction model
M, Ma1 to Ma4, Mb1 to Mb5, Mc1 to Mc2 area
Mx target area
T0 reference point in time
T1 prediction execution point in time
P1 first period
P2 second period
P3 past period
P4 future period
P21 to P25, P41 to P45 sub-period

DETAILED DESCRIPTION

Hereinafter, an example of our devices will be described with reference to the accompanying drawings. In the description of the drawings, the same or equivalent elements will be denoted by the same reference signs and an overlapping description may be omitted.

As illustrated in FIG. 1, a conveyance system 1 according to the example includes a conveyance path 4 and a plurality of conveyance vehicles 2 that can travel along the conveyance path 4. For example, the conveyance path 4 is a rail (track) laid in a factory and the like. The conveyance vehicle 2 is an unmanned conveyance vehicle that conveys an article. For example, the conveyance vehicle 2 is an overhead traveling vehicle, a track-guided cart or the like. As an example, the conveyance vehicle 2 is an overhead conveyance vehicle that can travel along the conveyance path 4. For example, the conveyance vehicle 2 is an Overhead Hoist Transfer (OHT). As an example, the article conveyed by the conveyance vehicle 2 is a cassette (what is called a Front Opening Unified Pod (FOUP)) containing a plurality of semiconductor wafers.

The conveyance path 4 is divided into a plurality of sections (bays) (12 pieces in the example in FIG. 1). The conveyance path 4 includes an intrabay route 5, which is a route within bays, and an interbay route 6, which is a route connecting different bays. A processing device 7 and a stocker 8 are provided along the conveyance path 4. The processing device 7 is a device that executes processing on the semiconductor wafers. The stocker 8 is a point where the conveyance vehicle 2 can temporarily place the article, and serves as a buffer. A joining part 9 is a point on the conveyance path 4 that requires an exclusive control to prevent the conveyance vehicles 2 from entering at the same time.

The conveyance path 4 is divided into a plurality of areas M. In FIG. 1, only a part of the areas M is indicated by a broken line frame. The area may also be referred to as a module. The area M illustrated in FIG. 1 matches with the section (bay) described above. However, the area M does not necessarily have to match with the section (bay) described above. For example, a part of region in one section (bay) may be set as an area M, or a combined region of the multiple sections (bays) may be set as an area M.

The processing device 7 and the stocker 8 are provided with a storing port for bringing in articles (that is, a point where the conveyance vehicle 2 unloads articles), and a retrieving port for taking out articles (for example, a point where the conveyance vehicle 2 picks up (loads) articles). The storing port and the retrieving port are disposed below the conveyance path 4. The storing port may also be used as the retrieving port. The stocker 8 has a plurality of shelves on which the articles are placed.

Figure 2:
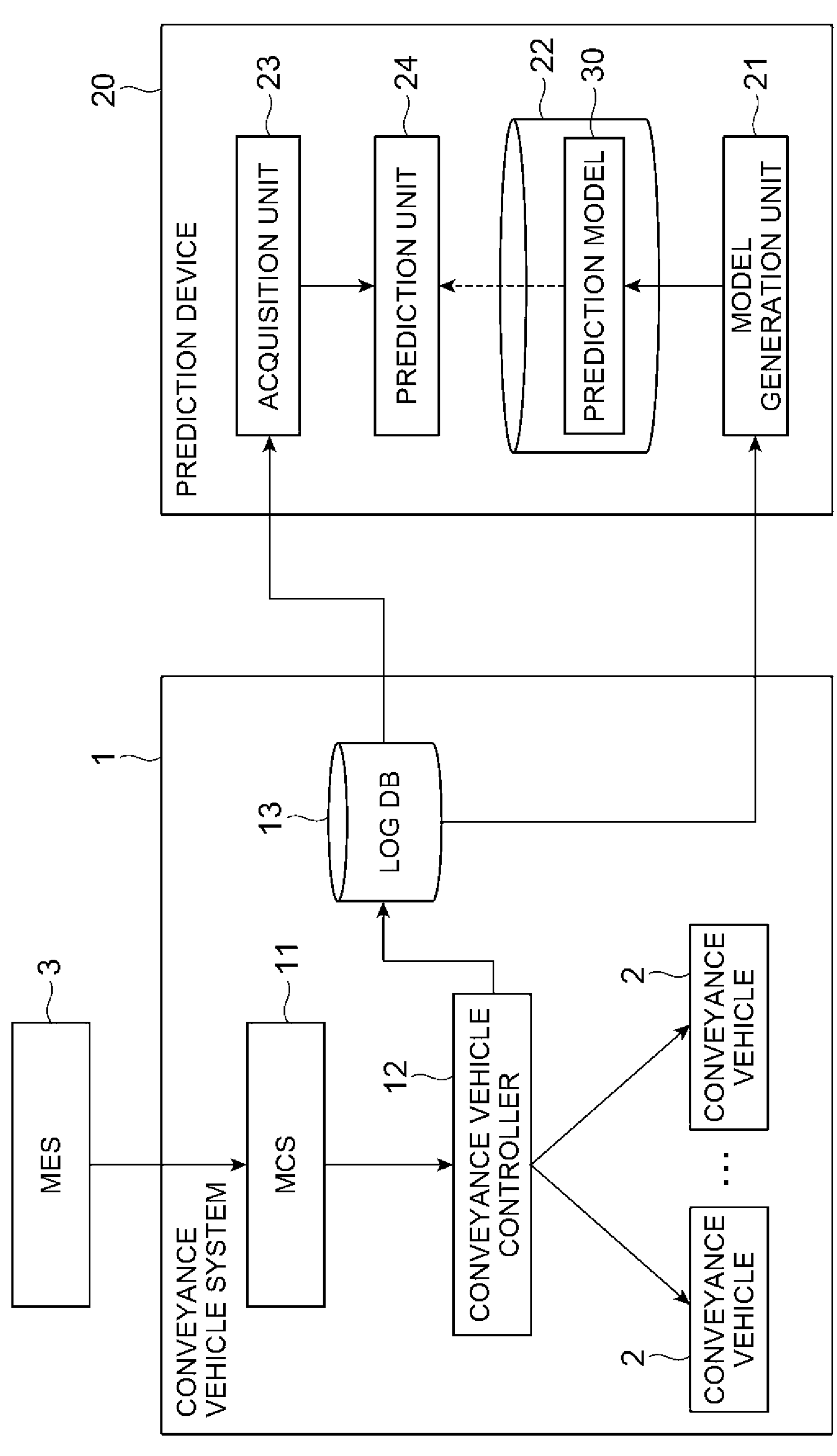
FIG. 2 is a block diagram illustrating a functional configuration of a prediction device and a conveyance system of an example.

As illustrated in FIG. 2, the conveyance system 1 includes a Material Control System (MCS) 11, a conveyance vehicle controller 12, a log DB 13, and the conveyance vehicles 2 that are to be controlled by the conveyance vehicle controller 12.

The MCS 11 acquires a transport request from an upper-level controller. In the example, the upper-level controller is a Manufacturing Execution System (MES) 3) managed by a manufacturer or the like. The MES 3 is capable of communicating with the processing device 7. The processing device 7 sends a transport request (a picking up request and an unloading request) of the article on which processing is performed, to the MES 3. The MES 3 sends the transport request received from the processing device 7 to the MCS 11.

Upon receiving the transport request from the MES 3, the MCS 11 converts the transport request to a transport command, and sends the transport command to the conveyance vehicle controller 12. Consequently, the transport command is assigned to a specific conveyance vehicle 2, via the conveyance vehicle controller 12. On the basis of predetermined selection criteria, the conveyance vehicle controller 12 determines the conveyance vehicle 2 to which a transport command is assigned. Moreover, the conveyance vehicle controller 12 determines a travel route to execute the transport command by executing a predetermined route search algorithm (for example, a known shortest route search algorithm and the like), and notifies the conveyance vehicle 2 of the travel route. Consequently, the conveyance vehicle 2 travels on the basis of the travel route.

A route map is stored in the conveyance vehicle controller 12 and the conveyance vehicle 2. The route map is information on the layout as illustrated in FIG. 1. Specifically, the route map is information indicating the arrangement of travel route (that is, the arrangement of the conveyance path 4 as illustrated in FIG. 1), the position set as an origin, the reference position set in advance, coordinates of the transfer position (the position of the storing port, retrieving port or the like described above) and the like. Moreover, the conveyance vehicle 2 holds the position information indicating the coordinates of the current position of the own vehicle, and by comparing the route map with the position information, the conveyance vehicle 2 travels on the basis of the travel route determined as described above.

The transport command includes information indicating the retrieving port (From port) for picking up an article to be conveyed, and information indicating the storing port (To port) for unloading the article to be conveyed. The conveyance vehicle 2 assigned with the transport command travels to the From port. Then, after picking up the article to be conveyed at the From port, the conveyance vehicle 2 conveys the article to the To port, and unloads the article at the To port.

The log DB 13 is a database that stores various logs indicating the state of the conveyance system 1. The log DB 13 may be configured on a single database device, or may be configured on a plurality of database devices. In the example, the log DB 13 stores a transport command log and a conveyance vehicle information log.

FIG. 3(A) is a diagram illustrating an example of a transport command log. The transport command log contains record information (information on one line) for each transport command. For example, every time the conveyance vehicle controller 12 assigns a transport command to the conveyance vehicle 2, the record on the transport command is added to the transport command log. As an example, the transport command log is output by the conveyance vehicle controller 12 that assigns a transport command. Alternatively, some or all of the information in the transport command log may be output by a device other than the conveyance vehicle controller 12.

The transport command log may include information on a conveyance vehicle ID, command execution start time, From port arrival time, conveyance completion time, From port area name, and To port area name. The "conveyance vehicle ID" is identification information to specify the conveyance vehicle 2 assigned with the transport command. The "command execution start time" is the time when the conveyance vehicle 2 has started to execute the transport command (that is, the travel to the From port). The "From port arrival time" is the time when the conveyance vehicle 2 has arrived at the From port. The "conveyance completion time" is the time when the conveyance vehicle 2 has completed the conveyance (that is, the storage (unloading) of the article to be conveyed to the To port). The "From port area name" is information indicating the area where the From port is located. The "To port area name" is information indicating the area where the To port is located. The "command execution start time," the "From port arrival time" and the "conveyance completion time" in the transport command log may be written in the transport command log after each time is determined. In other words, the "command execution start time," the "From port arrival time" and the "conveyance completion time" may be left blank (or information indicating that they are not yet determined) before each time is determined.

FIG. 3(B) is a diagram illustrating an example of a conveyance vehicle information log. The conveyance vehicle information log is information in which information notified from all the conveyance vehicles 2 in the conveyance system 1 are accumulated per unit time determined in advance. Hereinafter, this "unit of time" is referred to as a time step (ts). In the example, 1 ts (one unit of time) is four seconds.

The conveyance vehicle information log may include information on a time stamp, conveyance vehicle ID, area name, and a planned transit area. The "time stamp" is information indicating the point in time (for example, the number of time steps when a certain point in time is set as the reference (0 ts)) at which the information is notified from the conveyance vehicle 2. The "conveyance vehicle ID" is the same as the conveyance vehicle ID included in the transport command log. The "area name" is information indicating the area where the conveyance vehicle 2 indicated by the conveyance vehicle ID is traveling at the point in time indicated by the time stamp. The "planned transit area" is information that is stored when a transport command is assigned to the conveyance vehicle 2 indicated by the conveyance vehicle ID. Specifically, the "planned transit area" is information in which the areas included in the planned traveling route of the conveyance vehicle 2 are arranged in the planned transit order. For example, if the conveyance vehicle 2 is planned to pass through an area M1, an area M3, and an area M2 in this order, the "planned transit area" is information indicating the "area M1→area M3→area M2."

A prediction device 20 predicts (infers) the future state of a certain target area Mx in the conveyance system 1. More specifically, at any given point in time (prediction execution point in time), the prediction device 20 predicts the degree of increase or decrease in the number of conveyance vehicles in the target area Mx during the future period that is subsequent to the prediction execution point in time.

Figure 4:
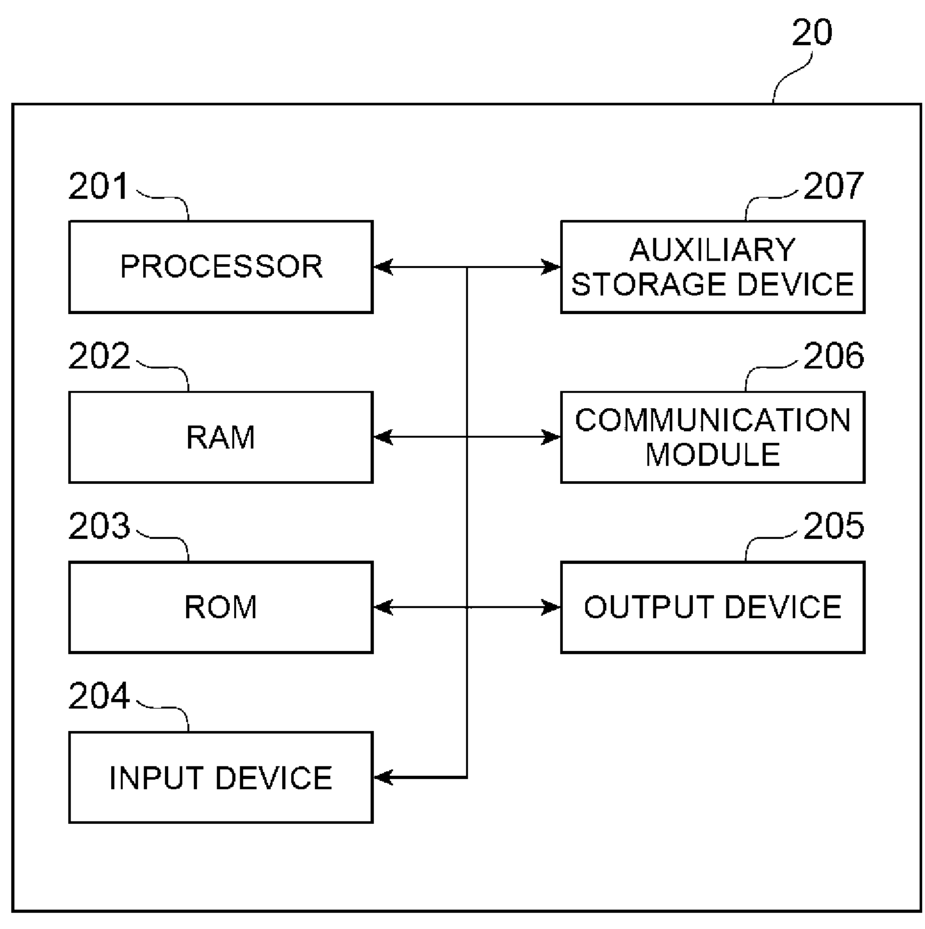
FIG. 4 is a block diagram illustrating an example of a hardware configuration of the prediction device.

As illustrated in FIG. 4, the prediction device 20 may be configured as a computer system including a processor 201 such as one or more Central Processing Units (CPUs), one or more Random Access Memories (RAMs) 202 and one or more Read Only Memories (ROMs) 203 that are main storage devices, an input device 204 such as a keyboard for allowing an operator to perform input operations, an output device 205 such as a display that presents information to the operator, a communication module 206 that performs communication with the conveyance system 1 (for example, the MCS 11, the conveyance vehicle controller 12 and the like), and an auxiliary storage device 207 such as an HDD and an SSD. The prediction device 20 may be configured of a single server device or may be configured of a plurality of server devices. Moreover, in this example, the prediction device 20 is configured as a device different from a group of controllers in the conveyance system 1. When a prediction process is performed by the prediction device 20 outside the group of controllers in this manner, there is an advantage that the group of controllers does not have to bear the computational burden of the prediction process. In other words, there is an advantage that the processing load of the group of controllers does not increase by executing the prediction process. However, the prediction device 20 may be incorporated into the controller (for example, the MCS 11, the conveyance vehicle controller 12 and the like) in the conveyance system 1.

For example, each function of the prediction device 20 is implemented by storing a predetermined computer program in memory such as the RAM 202, operating the input device 204 and the output device 205 under the control of the processor 201, operating the communication module 206, and reading and writing data from and to the RAM 202 and the auxiliary storage device 207.

As illustrated in FIG. 2, as functional components, the prediction device 20 includes a model generation unit 21, a storage unit 22, an acquisition unit 23, and a prediction unit 24. In this example, the prediction device 20 has a function of executing the model generation process and a function of executing the prediction process.

The model generation process is a process of generating a prediction model 30 used to predict the degree of increase or decrease in the number of conveyance vehicles in the target area Mx. The prediction process is a process of actually predicting the degree of increase or decrease in the number of conveyance vehicles in the target area Mx in the future period, using the prediction model 30 generated by the model generation process. Hereinafter, the model generation process and the prediction process will be described in detail.

Model Generation Process

Figure 5:
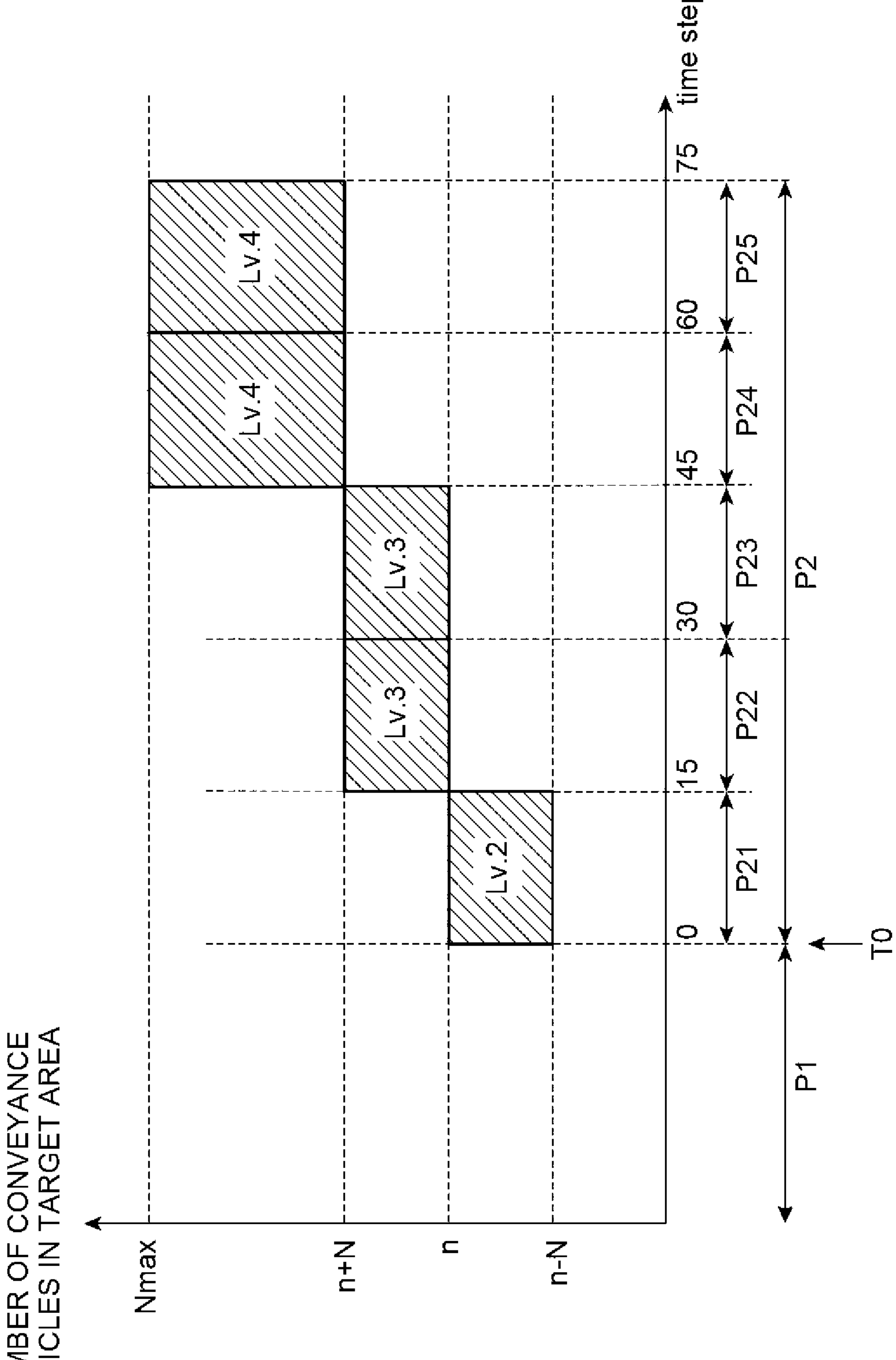
FIG. 5 is a diagram explaining a model generation process.

The model generation process is mainly performed by the model generation unit 21. The prediction model 30 generated by the model generation unit 21 is stored in the storage unit 22. FIG. 5 is a diagram explaining the model generation process. In FIG. 5, T0 indicates the reference point in time, P1 indicates the first period, and P2 indicates the second period. Hereinafter, while referring to FIG. 5 as appropriate, the model generation process will be described.

The prediction model 30 is a model that is trained by machine-learning to enter predetermined input data (explanatory variables) and output predetermined output data (objective variables). For example, the prediction model 30 can be configured by a neural network, a multilayer neural network built by deep learning or the like. As an example, the prediction model 30 can be built by a Recurrent Neural Network (RNN) that is one type of deep learning.

The input data of the prediction model 30 is data based on log information (in this example, the transport command log and the conveyance vehicle information log) on at least one of the assignment state of the transport command and the positions of the conveyance vehicles 2 during the first period P1 that is prior to the predetermined reference point in time T0. As an example, the length of the first period P1 is six hours. For example, if the reference point in time T0 is "12:00," the first period P1 is "6:00 to 12:00."

The output data of the prediction model 30 is the data indicating the prediction value of the degree of increase or decrease in the number of conveyance vehicles in the target area Mx during the second period P2 that is subsequent to the reference point in time T0. As an example, the length of the second period P2 is five minutes. For example, if the reference point in time T0 is "12:00," the second period P2 is "12:00 to 12:05."

The model generation unit 21 generates the prediction model 30 by performing machine learning using teacher data (training data) that is a data set including the input data described above and a correct answer label corresponding to the output data described above.

In this example, the transport command log (see FIG. 3(A)) is used as the log information (log information on the assignment state of the transport command) on which the input data is based. Moreover, the conveyance vehicle information log (see FIG. 3(B)) is used as the log information (log information on the positions of the conveyance vehicles 2) on which the input data is based. In other words, in this example, the input data to the prediction model 30 is generated by processing the information obtained from the transport command log and the conveyance vehicle information log.

FIG. 6 is a diagram illustrating an example of input data. Each of the data illustrated in FIG. 6 (Mx_VHL, Mx_Fm, Mx_To, Mx_Dec, and Mx_Inc) is time series data (vector data) in which the number of conveyance vehicles at each point in time summed up per ts during the first period P1 is arranged in the order of time. If the length of the first period P1 is six hours and 1 ts is four seconds, the length of the first period P1 is equivalent to 5400 ts. In this example, each data illustrated in FIG. 6 can be represented as a 5400-dimensional vector. Instead of entering all the data at once, the data may also be divided into a plurality of smaller batches to enter.

Mx_VHL is the data indicating the number of first conveyance vehicles observed during the first period P1. The first conveyance vehicles are the conveyance vehicles 2 located in the target area Mx. For example, Mx_VHL is time series data indicating the number of first conveyance vehicles observed per ts. Mx_VHL can be created based on the conveyance vehicle information log during the first period P1 (that is, the conveyance vehicle information log in which the "time stamp" indicates a point in time in the first period P1). For example, the model generation unit 21 can calculate the number of first conveyance vehicles at each point in time, by summing up the number of conveyance vehicle information logs (number of records) in which the "area name" is the target area Mx, for each point in time. The model generation unit 21 can create Mx_VHL, by arranging the number of first conveyance vehicles at each point in time calculated in this manner in the order of time.

Mx_Fm is the data indicating the number of second conveyance vehicles observed during the first period P1. The second conveyance vehicle is the conveyance vehicle 2 traveling to the From port (loading location) in the target area Mx on the basis of the transport command. For example, Mx_Fm is time series data indicating the number of second conveyance vehicles observed per ts. Mx_Fm can be created on the basis of the transport command log. For example, a transport command log corresponding to the transport command assigned to the conveyance vehicle 2 corresponding to the second conveyance vehicle at a certain point in time tp will be considered. In such a transport command log, the "command execution start time" is the time prior to the point in time tp, the "From port arrival time" and the "conveyance completion time" are the time subsequent to the point in time tp (or blank), and the "From port area name" is the target area Mx. Therefore, the model generation unit 21 can calculate the number of second conveyance vehicles at each point in time, by summing up the number of records in the transport command log corresponding to the conditions described above, for each point in time. The model generation unit 21 can create Mx_Fm, by arranging the number of second conveyance vehicles at each point in time calculated in this manner in the order of time.

Mx_To is the data indicating the number of third conveyance vehicles observed during the first period P1. The third conveyance vehicle is the conveyance vehicle 2 traveling to the To port (unloading location) in the target area Mx on the basis of the transport command. For example, Mx_To is time series data indicating the number of third conveyance vehicles observed per ts. Mx_To can be created on the basis of the transport command log. For example, a transport command log corresponding to the transport command assigned to the conveyance vehicle 2 corresponding to the third conveyance vehicle at a certain point in time tp will be considered. In such a transport command log, the "command execution start time" and the "From port arrival time" are the time prior to the point in time tp, the "conveyance completion time" is the time subsequent to the point in time tp (or blank), and the "To port area name" is the target area Mx. Therefore, the model generation unit 21 can calculate the number of third conveyance vehicles at each point in time, by summing up the number of records in the transport command log corresponding to the conditions described above, for each point in time. The model generation unit 21 can create Mx_To, by arranging the number of third conveyance vehicles at each point in time calculated in this manner in the order of time.

Mx_Dec is the data indicating the number of fourth conveyance vehicles observed during the first period P1. The fourth conveyance vehicle is the conveyance vehicle 2 that is traveling to another area from the target area Mx. For example, Mx_Dec is time series data indicating the number of fourth conveyance vehicles observed per ts. Such a fourth conveyance vehicle is classified into a conveyance vehicle traveling to the To port in the other area, after loading an article in the target area Mx (hereinafter, referred to as a "To conveyance vehicle"), and a conveyance vehicle to which a transport command is assigned and that is traveling to the From port in the other area, after going around or waiting in the target area Mx (hereinafter, referred to as a "From conveyance vehicle").

The number of To conveyance vehicles at each point in time can be calculated on the basis of the transport command log. For example, a transport command log corresponding to the transport command assigned to the conveyance vehicle 2 corresponding to the To conveyance vehicle at a certain point in time tp will be considered. In such a transport command log, the "transport execution start time" and the "From port arrival time" are the time prior to the point in time tp, the "conveyance completion time" is the time subsequent to the point in time tp (or blank), the "From port area name" is the target area Mx, and the "To port area name" is the other area. Therefore, the model generation unit 21 can calculate the number of To conveyance vehicles at each point in time, by summing up the number of records in the transport command log corresponding to the conditions described above, for each point in time.

The number of From conveyance vehicles at each point in time can be calculated on the basis of the transport command log and the conveyance vehicle information log. For example, the conveyance vehicle information log corresponding to the conveyance vehicle 2 corresponding to the From conveyance vehicle at a certain point in time tp will be considered. In such a conveyance vehicle information log (that is, a log in which the point in time tp is stored as the "time stamp," and the ID indicating the conveyance vehicle 2 is stored as the "conveyance vehicle ID"), the "area name" is the target area Mx. Moreover, a transport command log corresponding to the transport command assigned to the conveyance vehicle 2 corresponding to the From conveyance vehicle at a certain point in time tp will be considered. In such a transport command log, the "conveyance vehicle ID" is the ID indicating the conveyance vehicle 2 that satisfies the requirements of the conveyance vehicle information log described above, the "transport execution start time" is the time prior to the point in time tp, the "From port arrival time" and the "conveyance completion time" are the time subsequent to the point in time tp (or blank), and the "From port area name" is the other area. Therefore, the model generation unit 21 can calculate the number of From conveyance vehicles at each point in time, by summing up the number of records in the transport command log corresponding to the conditions described above, for each point in time.

The model generation unit 21 can calculate the number of fourth conveyance vehicles at each point in time, by adding the number of To conveyance vehicles and the number of From conveyance vehicles at each point in time calculated as described above. The model generation unit 21 can create Mx_Dec, by arranging the number of fourth conveyance vehicles at each point in time calculated in this manner in the order of time.

Mx_Inc is the data indicating the number of fifth conveyance vehicles observed during the first period. The fifth conveyance vehicle is the conveyance vehicle 2 that is traveling to a specific point in the target area Mx on the basis of the transport command. The specific point can be set as appropriate by the operator of the prediction device 20 or the like. As an example, the specific point includes both the From port and the To port. In this example, the fifth conveyance vehicle includes both the second conveyance vehicle and the third conveyance vehicle described above. In other words, the model generation unit 21 can create Mx_Inc, by summing up Mx_Fm and Mx_To.

Figure 7:
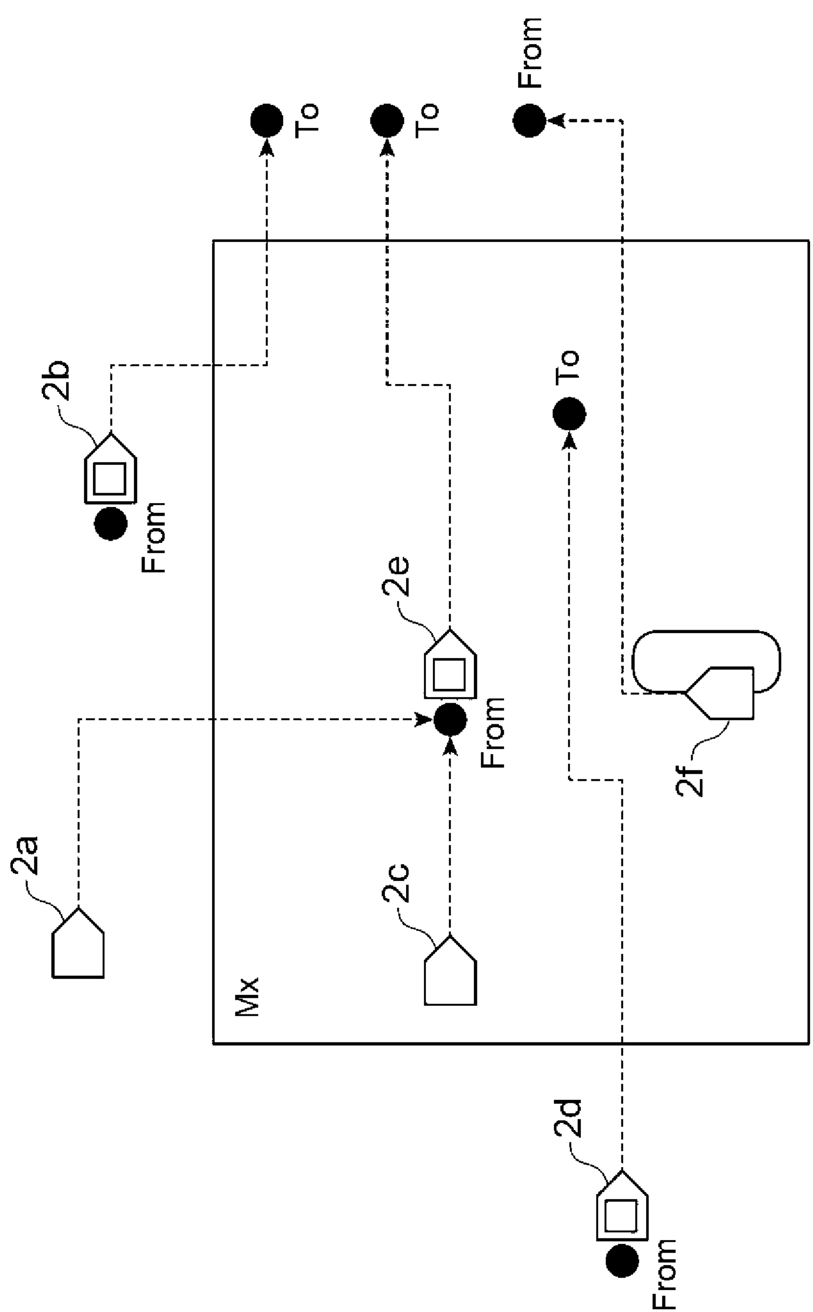
FIG. 7 is a diagram illustrating an example of a target area and a plurality of conveyance vehicles at a certain point in time.

FIG. 7 is a diagram illustrating an example of the target area Mx and a plurality of conveyance vehicles 2*a* to 2*f* at a certain point in time. For this example, the input data (Mx_VHL, Mx_Fm, Mx_to, Mx_Dec, and Mx_Inc) described above will be specifically described.

The conveyance vehicle 2*a* is the conveyance vehicle 2 traveling to the From port in the target area Mx on the basis of the transport command. Therefore, the conveyance vehicle 2*a* corresponds to the second conveyance vehicle described above, and is to be summed up in Mx_Fm and Mx_Inc. Moreover, when the conveyance vehicle 2*a* enters the target area Mx, the conveyance vehicle 2*a* also corresponds to the first conveyance vehicle described above, and is to be summed up in Mx_VHL.

The conveyance vehicle 2*b* is the conveyance vehicle 2 that is traveling to the To port in the second other area from the From port in the first other area on the basis of the transport command. The target area Mx is a planned transit area of the conveyance vehicle 2*b*. In this example, only when the conveyance vehicle 2*b* is traveling in the target area Mx, the conveyance vehicle 2*b* corresponds to the first conveyance vehicle described above, and is to be summed up in Mx_VHL.

The conveyance vehicle 2*c* is the conveyance vehicle 2 traveling to the From port in the target area Mx on the basis of the transport command. Therefore, the conveyance vehicle 2*c* corresponds to the second conveyance vehicle described above, and is to be summed up in Mx_Fm and Mx_Inc. Moreover, because the conveyance vehicle 2*c* is traveling in the target area Mx, the conveyance vehicle 2*c* also corresponds to the first conveyance vehicle described above, and is to be summed up in Mx_VHL.

The conveyance vehicle 2*d* is the conveyance vehicle 2 traveling to the To port in the target area Mx on the basis of the transport command. Therefore, the conveyance vehicle 2*d* corresponds to the third conveyance vehicle described above, and is to be summed up in Mx_To and Mx_Inc. Moreover, when the conveyance vehicle 2*d* enters the target area Mx, the conveyance vehicle 2*d* also corresponds to the first conveyance vehicle described above, and is to be summed up in Mx_VHL.

The conveyance vehicle 2*e* is the conveyance vehicle 2 traveling to the To port in the other area, after loading the article in the target area Mx on the basis of the transport command. Therefore, the conveyance vehicle 2*e* corresponds to the fourth conveyance vehicle (To conveyance vehicle) described above, and is to be summed up in Mx_Dec. Moreover, while the conveyance vehicle 2*e* is traveling in the target area Mx, the conveyance vehicle 2*e* also corresponds to the first conveyance vehicle described above, and is to be summed up in Mx_VHL.

The conveyance vehicle 2*f* is the conveyance vehicle 2 to which a transport command is assigned and that is traveling to the From port in the other area, after going around or waiting in the target area Mx. Therefore, the conveyance vehicle 2*f* corresponds to the fourth conveyance vehicle (From conveyance vehicle) described above, and is to be summed up in Mx_Dec. Moreover, while the conveyance vehicle 2*f* is traveling in the target area Mx, the conveyance vehicle 2*f* also corresponds to the first conveyance vehicle described above, and is to be summed up in Mx_VHL.

In this example, the fifth conveyance vehicle (that is, the conveyance vehicle 2 corresponding to either the second conveyance vehicle or the third conveyance vehicle) that is traveling to the target area Mx, is to be summed up equally in Mx_Fm, Mx_To, and Mx_Inc, regardless of how far away the fifth conveyance vehicle is traveling from the target area Mx. However, the fifth conveyance vehicle traveling the location relatively far from the target area Mx (hereinafter "distant conveyance vehicle") takes a relatively long time to arrive at the target area Mx. Moreover, the distant conveyance vehicle is susceptible to disturbance factors such as to be stuck in a traffic congestion in the other area before arriving at the target area Mx. In contrast, the fifth conveyance vehicle that is traveling relatively close to the target area Mx (hereinafter "neighboring conveyance vehicle") takes a relatively short time to arrive at the target area Mx, and is less susceptible to the disturbance factors as described above. Therefore, it is assumed that the degree of influence on the future number of conveyance vehicles in the target area Mx differs between the neighboring conveyance vehicle and the distant conveyance vehicle. On the other hand, in Mx_Fm, Mx_To, and Mx_Inc described above, the number of conveyance vehicles are not summed up by taking the distance from the target area Mx into consideration. Hence, the difference in the degrees of influence between the neighboring conveyance vehicle and the distant conveyance vehicle as described above is not taken into account.

Thus, the model generation unit 21 may further create the input data illustrated in FIG. 8. Mx_Inc1 to Mx_Inc3 and Mx_Spd1 to Mx_Spd3 illustrated in FIG. 8 are the time series data the same as each data illustrated in FIG. 6.

Mx_Inc1 to Mx_Inc3 are the data indicating the number of conveyance vehicles for each degree of proximity between the area in which the fifth conveyance vehicles are traveling and the target area Mx, the number of conveyance vehicles being obtained by summing up the fifth conveyance vehicles for each degree of the proximity. Specifically, Mx_Inc1 is the time series data obtained by summing up the fifth conveyance vehicles only traveling to the target area Mx from another area that is separated from the target area Mx by one area (that is, the other area directly adjacent to the target area Mx). Mx_Inc2 is the time series data obtained by summing up the fifth conveyance vehicles only traveling to the target area Mx from another area that is separated from the target area Mx by two areas. Mx_Inc3 is the time series data obtained by summing up the fifth conveyance vehicles only traveling to the target area Mx from another area that is separated from the target area Mx by three areas.

The model generation unit 21 can calculate the value of Mx_Inc1 at each point in time as follows. First, the model generation unit 21 extracts the fifth conveyance vehicle (hereinafter "short-distance conveyance vehicle") traveling in the other area that is separated from the target area Mx by one area as follows. That is, the model generation unit 21 refers to the "area name" and the "planned transit area" in the conveyance vehicle information log corresponding to each fifth conveyance vehicle. In this example, the "planned transit area" always includes the target area Mx. By referring to the "area name" and the "planned transit area" in the conveyance vehicle information log, the model generation unit 21 determines whether each fifth conveyance vehicle is traveling in the area that is planned to transit one before the target area Mx. The model generation unit 21 extracts the fifth conveyance vehicle that is determined to be traveling in the area planned to transit one before the target area Mx in the determination process described above, as the short-distance conveyance vehicle. The model generation unit 21 can calculate the value of Mx_Inc1 at each point in time, by summing up the number of short-distance conveyance vehicles extracted in this manner, for each point in time.

The values of Mx_Inc2 and Mx_Inc3 at each point in time are also obtained by the same method as described above. Specifically, the model generation unit 21 can obtain the value of Mx_Inc2 (or "Mx_Inc3") at each point in time by performing the process of "determining whether each fifth conveyance vehicle is traveling in the area planned to transit one before the target area Mx" described above in which "one before" is replaced by "two before" (or "three before").

Mx_Spd1 to Mx_Spd3 are the data relating to the speed of the fifth conveyance vehicle. Specifically, Mx_Spd1 is the time series data of the average speed of the conveyance vehicles 2 that are summed up in Mx_Inc1 at each point in time. Mx_Spd2 is the time series data of the average speed of the conveyance vehicles 2 that are summed up in Mx_Inc2 at each point in time. Mx_Spd3 is the time series data of the average speed of the conveyance vehicles 2 that are summed up in Mx_Inc3 at each point in time. For example, each conveyance vehicle 2 can be configured to notify the upper level controller (such as the conveyance vehicle controller 12) of the detailed position information (for example, position coordinates) of each conveyance vehicle 2 per ts. For example, by including the location information notified in this manner in the conveyance vehicle information log, the model generation unit 21 can calculate the speed of each conveyance vehicle 2 at each point in time as follows. In other words, by comparing the position coordinates notified from a certain conveyance vehicle 2 at a certain point in time to the position coordinates notified from the conveyance vehicle 2 at a point in time one before the point in time, the model generation unit 21 can recognize the distance the conveyance vehicle 2 has traveled during 1 ts. The model generation unit 21 can calculate the speed of the conveyance vehicle 2 at a certain point in time, by dividing the distance by 1 ts (in this example, four seconds). By calculating the average speed of the conveyance vehicles 2 calculated in this manner, the model generation unit 21 can calculate the values of Mx_Spd1 to Mx_Spd3 at each point in time.

Figure 9:
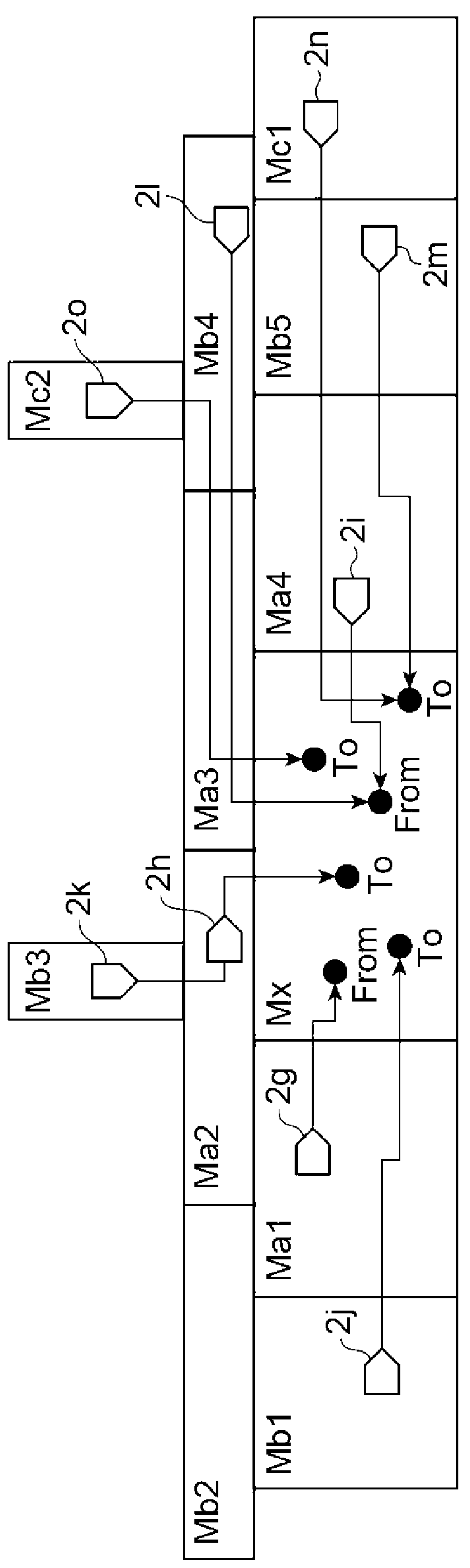
FIG. 9 is a diagram illustrating an example of a target area and a plurality of conveyance vehicles at a certain point in time.

FIG. 9 is a diagram illustrating an example of the target area Mx and a plurality of conveyance vehicles 2*g* to 2*o* at a certain point in time. For this example, the input data (Mx_Inc1 to Mx_Inc3 and Mx_Spd1 to Mx_Spd3) described above will be specifically described.

In this example, each of four areas Ma1 to Ma4 directly adjacent to the target area Mx corresponds to the other area that is separated from the target area Mx by one area. Therefore, at the point in time, the conveyance vehicles 2*g*, 2*h*, and 2*i* traveling in any of these areas Ma1 to Ma4 are to be summed up in Mx_Inc1. Moreover, the average speed of the conveyance vehicles 2*g*, 2*h*, and 2*i* is the value of Mx_Spd1 (value corresponding to the point in time).

Moreover, each of five areas Mb1 to Mb5 corresponds to the other area that is separated from the target area Mx by two areas. The areas Mb1 and Mb2 are adjacent to each other via the area Ma1. The area Mb3 is adjacent to the target area Mx via the area Ma2. The area Mb4 is adjacent to the target area Mx via the area Ma3. The area Mb5 is adjacent to the target area Mx via the area Ma4. Therefore, at the point in time, the conveyance vehicles 2*j*, 2*k*, 2*l*, and 2*m* that are traveling in any of the areas Mb1 to Mb5 are to be summed up in Mx_Inc2. Moreover, the average speed of the conveyance vehicles 2*j*, 2*k*, 2*l*, and 2*m* is the value of Mx_Spd2 (value corresponding to the point in time).

Furthermore, two areas Mc1 and Mc2 correspond to the other areas that are separated from the target area Mx by three areas. The area Mc1 is adjacent to the target area Mx via the areas Ma4 and Mb5. The area Mc2 is adjacent to the target area Mx via the areas Ma3 and Mb4. Therefore, at the point in time, the conveyance vehicles 2*n* and 2*o* that are traveling either of the areas Mc1 and Mc2 are to be summed up in Mx_Inc3. Moreover, the average speed of the conveyance vehicles 2*n* and 2*o* is the value of Mx_Spd3 (value corresponding to the point in time).

In this example, the range in which the number of conveyance vehicles are to be summed up for each degree of proximity to the target area Mx is the range separated from the target area Mx by up to three areas. However, the summed data of a range separated from the target area Mx by four areas or more may also be used as input data.

Next, a process of acquiring a correct answer label for teacher data will be described. In this example, by using the number of conveyance vehicles in the target area Mx at the reference point in time T0 as a reference value n, the model generation unit 21 sets a plurality of levels according to the degree of increase or decrease in the number of conveyance vehicles from the reference value n. Then, the model generation unit 21 sets the level to which the average number of conveyance vehicles in the target area Mx during the second period P2 belongs, as the correct answer label. The average number of conveyance vehicles in the target area Mx during the second period P2 is obtained as follows. For example, by generating Mx_VHL during the second period P2, the model generation unit 21 can obtain the number of conveyance vehicles in the target area Mx per unit time (per ts) during the second period P2. The model generation unit 21 can calculate the average number of conveyance vehicles in the target area Mx during the second period P2, by taking the average of the number of conveyance vehicles in the target area Mx per unit time during the second period P2 obtained in this manner.

In this example, as illustrated in FIG. 5, the model generation unit 21 divides the second period P2 into a plurality of sub-periods P21 to P25 along the time series, calculates the average number of conveyance vehicles in the target area Mx during each of the sub-periods P21 to P25, and specifies the level of each of the sub-periods P21 to P25. As an example, the model generation unit 21 sets the five sub-periods P21 to P25, by dividing the second period (five minutes (75 ts)) into segments of one minute (15 ts) each. For example, if the second period P2 is "12:00 to 12:05," the sub-period P21 is "12:00 to 12:01," the sub-period P22 is "12:01 to 12:02," the sub-period P23 is "12:02 to 12:03," the sub-period P24 is "12:03 to 12:04" and the sub-period P25 is "12:04 to 12:05."

FIG. 10 is a diagram illustrating an example of the levels described above. In this example, as the level in which the number of conveyance vehicles are less than the reference value n, Level 1 (Lv.1) and Level 2 (Lv.2) are set according to the degree of reduction. Moreover, as the level in which the number of conveyance vehicles is greater than the reference value n, Level 3 (Lv.3) and Level 4 (Lv.4) are set according to the degree of increase.

Level 1 is the level corresponding to when the average number of conveyance vehicles in the sub-period falls under "0≤average number of conveyance vehicles≤reference value n−N." Level 2 is the level corresponding to when the average number of conveyance vehicles in the sub-period falls under "reference value n−N<average number of conveyance vehicles≤reference value n." Level 3 is the level corresponding to when the average number of conveyance vehicles in the sub-period falls under "reference value n<average number of conveyance vehicles≤reference value n+N." Level 4 is the level corresponding to when the average number of conveyance vehicles in the sub-period falls under "reference value n+N<average number of conveyance vehicles≤Nmax." In this example, "N" is any pitch width set in advance. "Nmax" is the maximum allowable number of conveyance vehicles in the target area Mx (that is, the maximum number of conveyance vehicles that can be located in the target area Mx at the same time).

For example, when the reference value n is "30," N is "10" and Nmax is "60," in the example in FIG. 10, Level 1 is when the average number of conveyance vehicles is "0 to 20," Level 2 is when the average number of conveyance vehicles is "21 to 30," Level 3 is when the average number of conveyance vehicles is "31 to 40" and Level 4 is when the average number of conveyance vehicles is "41 to 60."

As described above, the model generation unit 21 acquires various pieces of time series data (Mx_VHL, MX_Fm, MX_To, MX_Dec, Mx_Inc, Mx_Inc1 to Mx_Inc3, and Mx_Spd1 to Mx_Spd3) during the first period P1 that are obtained on the basis of the transport command log and the conveyance vehicle information log, as the input data of the prediction model 30.

Moreover, the model generation unit 21 acquires the level to which the average number of conveyance vehicles in the target area Mx during the second period P2 belongs, as the correct answer label. In this example, the model generation unit 21 acquires the level to which the average number of conveyance vehicles in the target area Mx in each of the sub-periods P21 to P25 belongs, as the correct answer label. As an example, the correct answer label is represented by a probability value of the combination of each of the sub-periods P21 to P25 and each level (Level 1 to Level 4). In the example in FIG. 5, the number of sub-periods is "five" and the number of levels is "four." Hence, the correct answer label can be represented as a 20-dimensional vector containing 20 (=5×4) values (probability values) corresponding to each combination. In the example in FIG. 5, the average number of conveyance vehicles in the subperiod P21 belongs to Level 2, the average number of conveyance vehicles in the sub-period P22 belongs to Level 3, the average number of conveyance vehicles in the sub-period P23 belongs to Level 3, the average number of conveyance vehicles in the sub-period P24 belongs to Level 4, and the average number of conveyance vehicles in the sub-period P25 belongs to Level 4. In this example, the correct answer label is data in which "1" is set as the probability value of each of the combinations of the sub-period P21 and Level 2, the sub-period P22 and Level 3, the subperiod P23 and Level 3, the sub-period P24 and Level 4, and the sub-period P25 and Level 4, and "0" is the probability value of the combinations other than the above.

The model generation unit 21 generates a set (data set) of the input data and the correct answer label obtained as above for a certain reference point in time T0, as a single piece of teacher data. The model generation unit 21 can generate a plurality of pieces of teacher data, by using each of a plurality of points in time different from each other as the reference point in time, and generating teacher data corresponding to each point in time. The model generation unit 21 generates the prediction model 30 by performing machine learning using the pieces of teacher data generated in this manner. The prediction model 30 generated by the model generation unit 21 will be stored (saved) in the storage unit 22.

The model generation process described above may be performed for each predetermined learning execution cycle. For example, the learning execution cycle is six hours. For example, by using each of a plurality of points in time included in a target period from the generation timing (for example, 6:00) of the previous prediction model 30 to the generation timing (for example, 12:00) of the current prediction model 30 (for example, each of 5400 points in time obtained by dividing a period of 6:00 to 12:00 by 1 ts (four seconds) as the reference point in time, the model generation unit 21 generates a plurality of pieces (in this example, 5400 pieces) of teacher data. The model generation unit 21 generates the current prediction model 30 by performing machine learning using the pieces of teacher data generated in this manner. Then, the storage unit 22 stores the current prediction model 30 generated by the model generation unit 21 in association with the target period described above, without deleting the prediction model 30 generated in the past by the model generation unit 21. According to the configuration described above, it is possible to generate and store the prediction model 30 according to the characteristics of the target period (such as the operation status of the conveyance system 1) for each target period. Consequently, it is possible to obtain various prediction models 30 that can be used for prediction.

The teacher data (correct answer label) corresponding to the reference point in time included in the period within five minutes (11:55 to 12:00) from the generation timing (for example, 12:00) of the prediction model 30 is not obtained at the generation timing described above. For example, the correct answer label of the teacher data in which the generation timing (12:00) is the reference point in time can only be obtained after the second period P2 (in this example, five minutes) has passed from the generation timing (that is, after "12:05"). Therefore, to immediately start generating the prediction model 30 at the generation timing, the model generation unit 21 may perform machine learning, by only using the teacher data that can obtain the correct answer label at the point in time in generation timing (for example, the teacher data corresponding to the reference point in time included in the period from 6:00 to 11:55).

FIG. 11 is a diagram illustrating an example of the prediction models 30 stored in the storage unit 22. "MX-DW_No.h5" illustrated in the table is an example of the file name of the prediction model 30. In this example, "X" illustrated above indicates the time zone. Specifically, "0" represents "0:00 to 6:00," "1" represents "6:00 to 12:00," "2" represents "12:00 to 18:00" and "3" represents "18:00 to 24:00." "D" illustrated above indicates the day of the week. "W" illustrated above indicates which week the prediction model 30 is generated based on a predetermined point in time (week 0). "No" illustrated above indicates the number of the prediction model 30. For example, "No" is used to specify the type of each prediction model such as when ensemble learning is performed using multiple prediction models in which the contents of input data or hyperparameters, which will be described below, are different from each other. ".h5" illustrated above is an extension set to the model generated using TensorFlow (registered trademark). In the example in FIG. 11, the current point in time is 6:00 to 12:00 on Monday (Mon) of the tenth cycle (w10), and the prediction models 30 up to the immediately preceding time zone are generated and stored.

Figure 12:
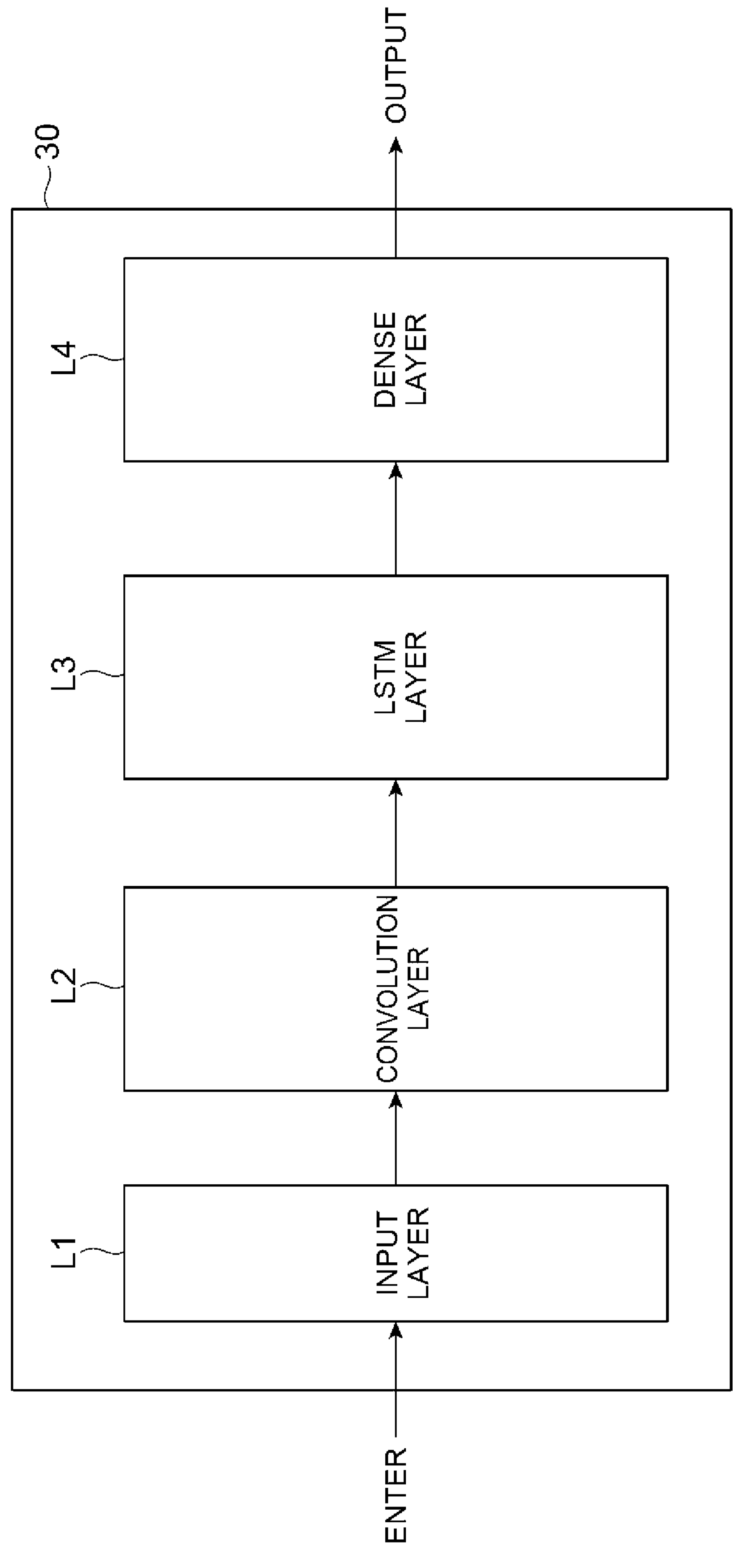
FIG. 12 is a diagram illustrating an example of the basic structure of a prediction model.

FIG. 12 is a diagram illustrating an example of the basic structure of the prediction model 30. As illustrated in FIG. 12, as an example, the prediction model 30 can be configured including an Input Layer L1, a Convolution Layer L2, a Long short-term memory (LSTM) Layer L3, and a Dense Layer L4. The Input Layer L1 is a layer that receives input data for the prediction model 30. The Dense Layer L4 is a layer that combines the results processed by the Convolution Layer L2 and the LSTM Layer L3, and that generates and outputs data (in the example, 20 probability values corresponding to all the combinations of each level (Levels 1 to 4) and each of the sub-periods) used for finally outputting the combined results from the prediction model 30. Each of these Layers L1 to L4 includes an external parameter (hyperparameter) that is not adjusted (changed) within the framework of machine learning using the teacher data described above. For example, as the external parameters, the Input Layer L1 can include the size of input data (Input dim, Input length), Batch size (batch_size) and the like. The variable names in the parentheses are API variable names defined in TensorFlow (registered trademark). The same applies to the following description. As the external parameters, the Convolution Layer L2 may include whether Layer is used (Conv1D), the number of Filters (filters), Kernel size (kernel_size), Strides width (strides), whether Max Pooling is used (MaxPooling1D), the pool size of Max Pooling (pool_size), Dropout percentage (Dropout) and the like. As the external parameters, the LSTM Layer L3 may include the number of Layers (LSTM), the number of Nodes (units), output normalization (activity_regularizer), weight normalization (recurrent regularizer), Dropout percentage (Dropout) and the like. As the external parameters, the Dense Layer L4 may include the number of Layers (Dense), the number of Nodes (units), output normalization (activity_regularizer), Dropout percentage (Dropout) and the like. These hyperparameters can be freely adjusted by the operator of the prediction device 20 and the like.

Figure 13:
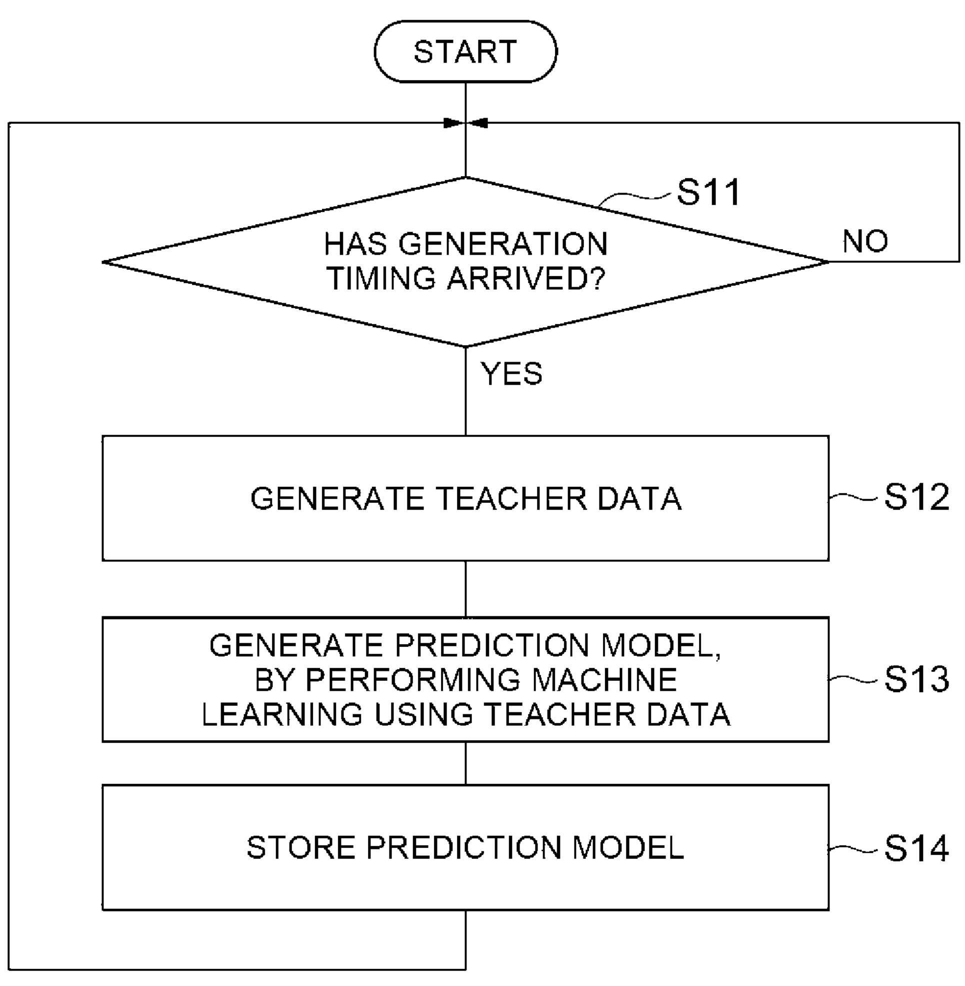
FIG. 13 is a flowchart illustrating an example of a model generation process.

FIG. 13 is a flowchart illustrating an example of a model generation process. Upon the arrival of the generation timing defined on the basis of the predetermined learning execution cycle (in this example, one of 0:00, 6:00, 12:00, and 18:00) (Yes at step S11), the model generation unit 21 generates teacher data (step S12). For example, the model generation unit 21 generates a plurality of pieces of teacher data, by setting each of a plurality of points in time included in the target period from the generation timing of the previous prediction model 30 to the generation timing of the current prediction model 30 as the reference point in time T0 (see FIG. 5), and generating teacher data corresponding to each reference point in time. Among the pieces of teacher data, the teacher data that can be generated before the generation timing described above arrives may be generated in advance before the generation timing arrives. Subsequently, the model generation unit 21 generates the prediction model 30, by performing machine learning using the generated pieces of teacher data (step S13). As illustrated in FIG. 11, the prediction model 30 generated by the model generation unit 21 is stored in the storage unit 22 in association with the target period described above (step S14).

Prediction Process

Figure 14:
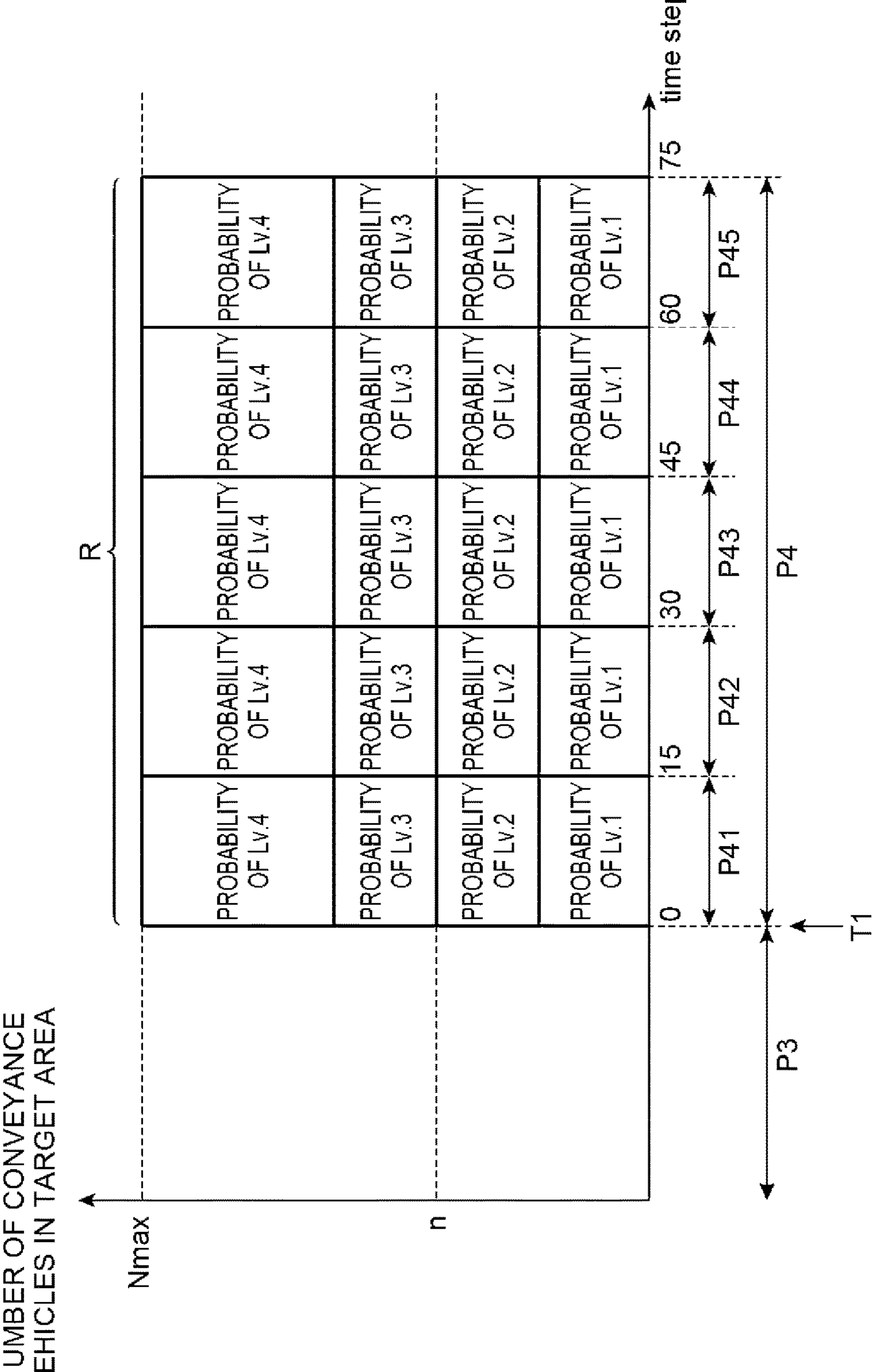
FIG. 14 is a diagram explaining a prediction process.

A prediction process is mainly performed by the acquisition unit 23 and the prediction unit 24. FIG. 14 is a diagram explaining a prediction process. In FIG. 14, T1 indicates the prediction execution point in time, P3 indicates the past period (for example, six hours), and P4 indicates the future period (for example, five minutes). P41 to P45 indicate subperiods obtained by dividing the future period P4 into segments of one minute (15 ts) each.

The acquisition unit 23 acquires data for prediction during the past period P3 that is prior to any prediction execution point in time T1. The data for prediction is data corresponding to a portion (input data) of the teacher data used to train the prediction model 30, excluding the correct answer label. The past period P3 is a period having the same length as that of the first period P1 (see FIG. 5). In other words, the past period P3 is the period corresponding to the first period P1, when the prediction execution point in time T1 is the reference point in time T0 in the model generation process (see FIG. 5). By performing the same process as that of the model generation unit 21 described above, the acquisition unit 23 acquires various pieces of time series data during the past period P3 (Mx_VHL, MX_Fm, MX_To, MX_Dec, Mx_Inc, Mx_Inc1 to Mx_Inc3, and Mx_Spd1 to Mx_Spd3) that can be acquired on the basis of the transport command log and the conveyance vehicle information log, as the data for prediction.

The prediction unit 24 enters the data for prediction acquired by the acquisition unit 23 into the prediction model 30, to acquire prediction information R indicating the prediction value of the degree of increase or decrease in the number of conveyance vehicles in the target area Mx during the future period P4-subsequent to the prediction execution point in time T1. In this example, the prediction information R is information that indicates the prediction results of the level to which the average number of conveyance vehicles in the target area Mx during the future period P4 belongs, using the number of conveyance vehicles in the target area Mx at the prediction execution point in time T1 as the reference value n. More specifically, the prediction information R indicates the prediction results in each of the sub-periods P41 to P45 that can be obtained by dividing the future period P4 into segments of one minute (15 ts) each. In other words, the prediction information R is information that indicates the prediction results of the level to which the average number of conveyance vehicles in the target area Mx in each of the sub-periods P41 to P45 included in the future period P4 belongs.

The prediction information R is the data corresponding to the correct answer label of the teacher data used for training the prediction model 30. In other words, the prediction information R is the probability value (prediction value) of each combination (20 ways) of the five sub-periods P41 to P45 included in the future period P4 and each level (Levels 1 to 4). For example, for each of the sub-periods P41 to P45, the prediction unit 24 can obtain the level with the highest probability value as the level (prediction result) to which the average number of conveyance vehicles in the target area Mx is expected to belong.

The prediction unit 24 may be configured to be able to select any prediction model 30 to be used for prediction, from a plurality of the prediction models 30 (see FIG. 11) stored in the storage unit 22.

For example, the prediction unit 24 may select the prediction model 30 associated with the most recent target period, from the prediction models 30 stored in the storage unit 22. In the example in FIG. 11, when the prediction execution point in time T1 is 6:00 to 12:00 on Monday (Mon) of the tenth cycle (w10), the prediction unit 24 may select the latest prediction model 30 (M0-Mon10_1.h5) associated with the most recent target period. By performing prediction using the latest prediction model 30 generated for the most recent target period in this manner, it is possible to perform accurate prediction when the operation status the same as that of the most recent time zone will most likely continue or the like.

Alternatively, the prediction unit 24 may select the prediction model 30 associated with the past target period corresponding to the period including the prediction execution point in time, from the prediction models 30 (see FIG. 11) stored in the storage unit 22. In the example in FIG. 11, when the prediction execution point in time T1 is 6:00 to 12:00 on Monday (Mon) of the tenth cycle (w10), for example, the prediction unit 24 may select the prediction model 30 (M1-Mon9_1.h5) associated with the past target period that is the same time zone of the same day as that of the prediction execution point in time T1. By performing prediction using the prediction model 30 associated with the past target period corresponding to the period including the prediction execution point in time T1, the prediction can be accurately performed when day periodicity (for example, the tendency in which the operation status of the conveyance system 1 becomes substantially the same when the day and time zone are the same) is high and the like. Moreover, as another example, when monthly periodicity (for example, the tendency in which the operation status of the conveyance system 1 becomes substantially the same when the date and time zone are the same every month) is high and the like, the prediction unit 24 may select the prediction model 30 associated with the same day and the same time zone of the month preceding the prediction execution point in time T1. For example, when the prediction execution point in time T1 is 6:00 to 12:00 on May 1, the prediction model 30 associated with 6:00 to 12:00 on April 1 may be selected. Moreover, as further another example, when yearly periodicity (for example, the tendency in which the operation status of the conveyance system 1 becomes substantially the same when the date and month and the time zone are the same every year) is high and the like, the prediction unit 24 may select the prediction model 30 associated with the same date and month and the same time zone of the year preceding the prediction execution point in time T1. For example, when the prediction execution point in time T1 is 6:00 to 12:00 on May 1, 2021, the prediction model 30 associated with 6:00 to 12:00 on May 1, 2020 may be selected.

The prediction unit 24 may acquire the prediction information R by performing the prediction process using the prediction model 30 and notify the conveyance vehicle controller 12 of the prediction information R, for each prediction execution cycle that is shorter than the second period P2 (that is, the future period P4 serving as the prediction target period). For example, the prediction execution cycle is one minute (15 ts). According to the configuration described above, it is possible to allow the conveyance vehicle controller 12 to always recognize the prediction results relating to the number of conveyance vehicles in the target area Mx. As a result, it is possible to make the conveyance vehicle controller 12 to continuously perform the desired conveyance control (for example, the selection of the conveyance vehicle 2 to which a transport command is assigned, selection of the travel route of the conveyance vehicle 2 and the like) in which the prediction results are taken into account. As a result, it is possible to suppress the occurrence of traffic congestion in the conveyance system 1, and improve the efficiency of conveyance.

Figure 15:
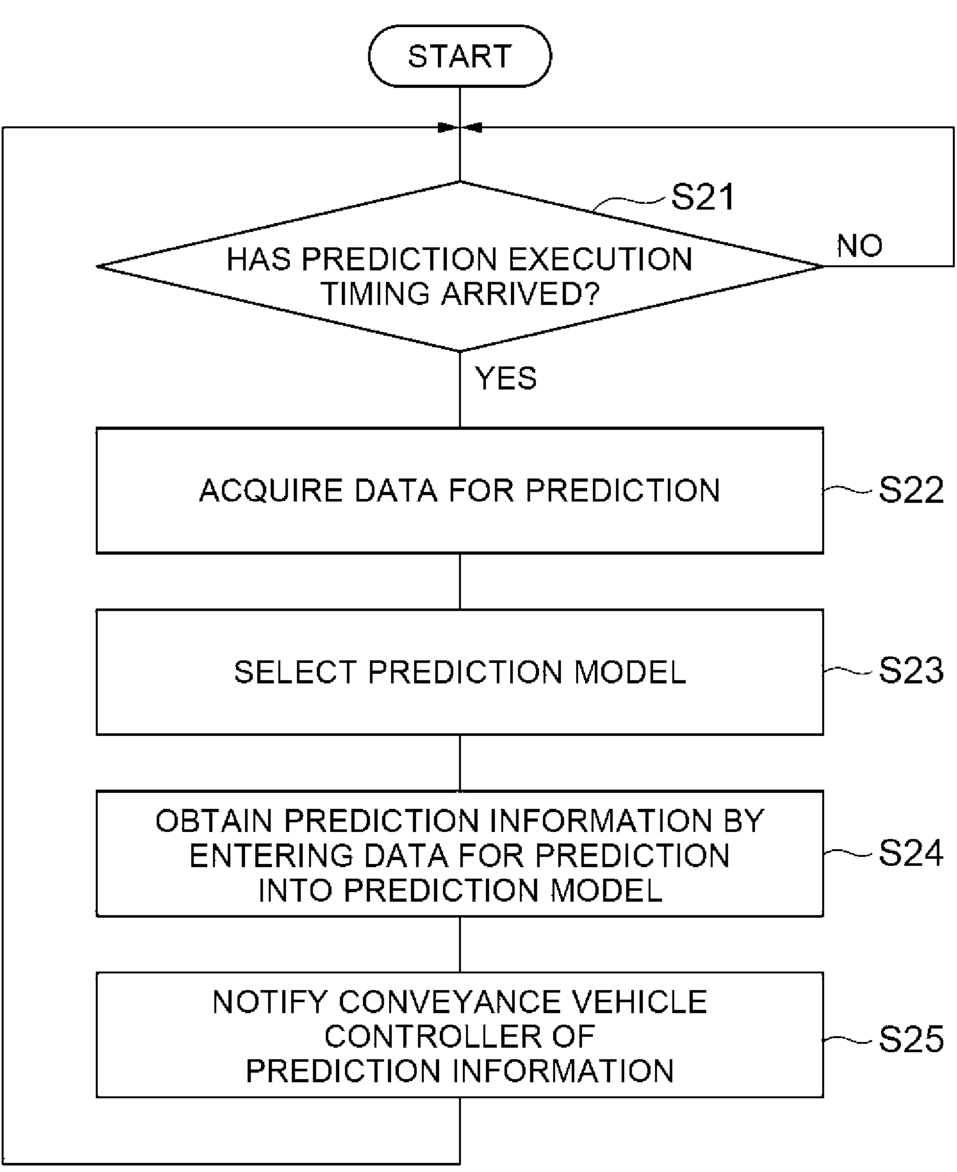
FIG. 15 is a flowchart illustrating an example of the prediction process.

FIG. 15 is a flowchart illustrating an example of the prediction process. Upon the arrival of the generation timing defined on the basis of the predetermined prediction execution cycle (in this example, timing per minute) (Yes at step S21), the acquisition unit 23 acquires (generates) the data for prediction (step S22). As in this example, when the prediction process is repeatedly performed in a relatively short prediction execution cycle, at every prediction timing, the acquisition unit 23 may only acquire (generate) the data for prediction corresponding to the period of the current prediction timing from the last prediction timing. Therefore, the acquisition unit 23 can complete the process of acquiring the data for prediction at step S22 in a relatively short period of time. Subsequently, the prediction unit 24 selects the prediction model 30 used for the prediction process from the prediction models 30 (see FIG. 11) stored in the storage unit 22 (step S23), on the basis of the determination criteria as described above. Subsequently, the prediction unit 24 acquires the prediction information R output from the prediction model 30, by entering the data for prediction into the selected prediction model 30 (step S24). The prediction unit 24 notifies the conveyance vehicle controller 12 of the acquired prediction information R (step S25).

The prediction device 20 described above prepares the prediction model 30 configured to enter the input data (see FIGS. 6 and 8) based on the log information (information on at least one of the assignment state of the transport command and the positions of the conveyance vehicles 2) during the first period P1 (see FIG. 5) and output the output data indicating the prediction results of the degree of increase or decrease in the number of conveyance vehicles in the target area Mx during the second period P2 (see FIG. 5). Consequently, at any prediction execution point in time T1 (see FIG. 14), it is possible to obtain the prediction results (prediction information R) of the degree of increase or decrease in the number of conveyance vehicles in the target area Mx during the future period P4 (see FIG. 14) subsequent to the prediction execution point in time T1, by simply entering the data for prediction obtained from the log information during the past period P3 (see FIG. 14) prior to the prediction execution point in time T1 into the prediction model 30. Therefore, according to the prediction device 20, it is possible to easily predict the degree of future traffic congestion in the conveyance system 1 at any given timing.

Moreover, by including Mx_VHL (see FIG. 6) in the input data (data for prediction) of the prediction model 30, it is possible to accurately predict the degree of increase or decrease in the number of conveyance vehicles in the target area Mx during the future period P4, while taking into account the number of conveyance vehicles 2 (first conveyance vehicles) located in the target area Mx during the past period P3.

Furthermore, by including Mx_Fm (see FIG. 6) in the input data (data for prediction) of the prediction model 30, it is possible to accurately predict the degree of increase or decrease in the number of conveyance vehicles in the target area Mx during the future period P4, while taking into account the number of conveyance vehicles 2 (second conveyance vehicles) traveling to the loading location (From port) in the target area Mx during the past period P3.

Still furthermore, by including Mx_To (see FIG. 6) in the input data (data for prediction) of the prediction model 30, it is possible to accurately predict the degree of increase or decrease in the number of conveyance vehicles in the target area Mx during the future period P4, while taking into account the number of conveyance vehicles 2 (third conveyance vehicles) traveling to the unloading location (To port) in the target area Mx during the past period P3.

Still furthermore, by including Mx_Dec (see FIG. 6) in the input data (data for prediction) of the prediction model 30, it is possible to accurately predict the degree of increase or decrease in the number of conveyance vehicles in the target area Mx during the future period P4, while taking into account the number of conveyance vehicles 2 (fourth conveyance vehicles) traveling to another area from the target area Mx during the past period P3.

Still furthermore, by including Mx_Inc (see FIG. 6) in the input data (data for prediction) of the prediction model 30, it is possible to accurately predict the degree of increase or decrease in the number of conveyance vehicles in the target area Mx during the future period P4, while taking into account the number of conveyance vehicles 2 (fifth conveyance vehicles) traveling to a specific point (in the example, From port and To port) in the target area Mx during the past period P3.

Still furthermore, by including Mx_Inc1 to Mx_Inc3 (see FIG. 8) in the input data (data for prediction) of the prediction model 30, it is possible to more accurately predict the degree of increase or decrease in the number of conveyance vehicles in the target area during the future period, while taking into account the difference in the influence degree on the number of conveyance vehicles in the target area Mx by the degree of proximity to the target area Mx. In other words, by dividing the fifth conveyance vehicles into groups based on how far away each fifth conveyance vehicle is traveling from the target area Mx, and supplying information on the number of fifth conveyance vehicles classified and summed up for each group into the prediction model 30, it is possible to perform prediction while taking into account the difference in the influence degree by the degree of proximity.

For example, the conveyance system 1 may include various types of areas such as a process area where the processing device 7 is mainly disposed, a stocker area where the stocker 8 is mainly disposed, and a bypass area that mainly functions as a bypass (detour). According to the type of the target area Mx among the types of areas described above, the main type to which one or more other areas that are directly adjacent to the target area Mx belongs may also vary. Then, according to the type of the area, the average time required for the conveyance vehicle 2 to pass through the area may also vary. For example, with the bypass area, basically, the conveyance vehicle 2 just pass through the area. Hence, the conveyance vehicle 2 may pass through the area in a relatively short time. On the other hand, with the process area, the conveyance vehicle 2 picks up or unloads an article and the like. Hence, it may take a relatively long time for the conveyance vehicle 2 to pass through the area. Therefore, the degree of influence on the increase or decrease in the future number of conveyance vehicles in the target area Mx may differ between the example in which a relatively large number of conveyance vehicles 2 are located in the bypass area adjacent to the target area Mx, and when a relatively large number of conveyance vehicles 2 are located in the process area adjacent to the target area Mx. By using Mx_Inc1 to Mx_Inc3 that indicate the number of conveyance vehicles for each degree of proximity to the target area Mx as input data of the prediction model 30 as described above, it is possible to perform prediction while taking into the account the characteristics such as what kind of area is the target area Mx (that is, what kind of area is mainly located in the vicinity of the target area Mx) and the like in a secondary manner.

Moreover, by including Mx_Spd1 to Mx_Spd3 (see FIG. 8) in the input data (data for prediction) of the prediction model 30, it is possible to add information that can be used as clues for the period during which the number of conveyance vehicles in the target area Mx is expected to increase by the inflow of the fifth conveyance vehicles, to the input data. As a result, it is possible to more accurately predict the degree of increase or decrease in the number of conveyance vehicles in the target area MX during the future period P4.

Furthermore, the prediction device 20 can appropriately generate the prediction model 30 to be used in the prediction process, by including the model generation unit 21 described above.

Still furthermore, by using the number of conveyance vehicles in the target area Mx at the reference point in time T0 as the reference value n, the model generation unit 21 sets the levels according to the degree of increase or decrease in the number of conveyance vehicles from the reference value n. By using each of the points in time different from each other as the reference point in time T0, the model generation unit 21 generates the pieces of teacher data including the input data during the first period P1 and the correct answer label indicating the level to which the average number of conveyance vehicles in the target area Mx during the second period P2 belongs. Then, the model generation unit 21 generates the prediction model 30, by performing machine learning using such pieces of teacher data. Using the number of conveyance vehicles in the target area Mx at the prediction execution point in time T1 as the reference value n, the prediction unit 24 acquires information as the prediction information R by entering the data for prediction into the prediction model 30, the acquired information indicating the prediction results of the level to which the average number of conveyance vehicles in the target area Mx during the future period P4 belongs. According to the configuration described above, based on the number of conveyance vehicles in the target area Mx at the prediction execution point in time T1, it is possible to easily recognize whether the number of conveyance vehicles in the target area Mx is in the direction of increase or is in the direction of decrease, on the basis of the prediction results of the level.

Moreover, by dividing the second period P2 into the sub-periods P21 to P25 along the time series, and using each of the points in time different from each other as the reference point in time T0, the model generation unit 21 generates the pieces of teacher data including the input data during the first period P1 and the correct answer label indicating the level to which the average number of conveyance vehicles in the target area Mx in each of the sub-periods P21 to P25 belongs. Then, the model generation unit 21 generates the prediction model 30, by performing machine learning using such pieces of teacher data. The prediction unit 24 acquires information as the prediction information R by entering the data for prediction into the prediction model 30, the acquired information indicating the prediction results of the level to which the average number of conveyance vehicles in the target area Mx in each of the sub-periods P41 to P45 included in the future period P4 belongs. According to the configuration described above, the prediction results of the level can be obtained for each of the sub-periods P41 to P45 included in the future period P4. Hence, it is possible to predict the transition tendency (for example, any one of the tendency to keep increasing, tendency to keep decreasing, tendency to increase after a decrease, tendency to decrease after an increase and the like) of the future number of conveyance vehicles in the target area Mx.

The example has been described in detail. However, this disclosure is not limited to the example described above and various modifications may be made within a scope not departing from the appended claims.

For example, in the above example, all the pieces of time series data (Mx_VHL, MX_Fm, MX_To, MX_Dec, Mx_Inc, Mx_Inc1 to Mx_Inc3, and Mx_Spd1 to Mx_Spd3) illustrated in FIGS. 6 and 8 are used as the input data (data for prediction) for the prediction model 30. However, some of the time series data may be used as the input data of the prediction model 30. Moreover, the input data (data for prediction) of the prediction model 30 may include data other than the time series data illustrated in FIGS. 6 and 8.

Furthermore, in the example described above, the prediction model 30 outputs the prediction results of each of the five sub-periods P41 to P45. However, the number of subperiods may be four or less, or six or more. Still furthermore, the future period P4 serving as the prediction target period may not be divided into multiple sub-periods. In other words, the prediction model 30 may be configured to output the prediction results (probability values of the levels) for a single future period P4.

Still furthermore, in the example described above, the four levels according to the average conveyance vehicles in the future target area Mx are set. However, three levels or less may be set, or five levels or more may be set. For example, in the example described above, the two levels (Level 3 and Level 4) are set in the direction of increase and the two levels (Level 1 and Level 2) are set in the direction of decrease, from the number of conveyance vehicles (reference value n) in the target area Mx at the reference point in time T0 (prediction execution point in time T1). However, this may be further simplified, and only two levels including the level indicating the number of conveyance vehicles is increased than the reference value n and the level indicating the number of conveyance vehicles is decreased than the reference value n may be set.

Still furthermore, for each of the sub-periods P41 to P45, comparing the size of the "probability of Level 1+probability of Level 2" to the "probability of Level 3+probability of Level 4," the prediction unit 24 may acquire, when the former is large, the prediction results indicating that the number of conveyance vehicles is likely to decrease from the current number of conveyance vehicles, and acquire, when the latter is large, the prediction results indicating that the number of conveyance vehicles is likely to increase from the current number of conveyance vehicles. If the reference value n is close to Nmax and if Level 4 is not present, for each of the sub-periods P41 to P45, the prediction unit 24 may compare the size of the "probability of Level 1+probability of Level 2" with the "probability of Level 3." Similarly, if the reference value n is close to zero and if Level 1 is not present, for each of the sub-periods P41 to P45, the prediction unit 24 may compare the size of the "probability of Level 2" with the "probability of Level 3+probability of Level 4."

Still furthermore, in the example described above, a configuration of the process of the prediction device 20 is described by focusing on a single target area Mx. However, the prediction device 20 may perform a prediction process on a plurality of the target areas in the conveyance system 1. For example, the model generation unit 21 may generate the prediction model 30 for each of the target areas, and the prediction unit 24 may perform a prediction process on each target area, using the prediction model 30 generated for each target area.

Still furthermore, in the example described above, a single prediction model 30 in which the type of the input data and the setting content of the hyperparameter are fixed is used. However, as the prediction model for a certain target area Mx, the model generation unit 21 may generate a plurality of the prediction models 30 in which at least one of the type of the input data and the setting content of the hyperparameter are different from each other. Then, the prediction unit 24 may acquire the prediction results (prediction information R) output from each prediction model 30, by entering the data for prediction according to each of the prediction models 30 into each prediction model 30. In other words, the prediction device 20 may predict the future number of conveyance vehicles in the target area Mx, by performing ensemble learning using the prediction models 30 as described above. In the above example, for each of the sub-periods P41 to P45, the probability of each level will be obtained as many as the number of prediction models 30. By adding the output results (probability values) of the prediction models 30 for each combination with the same sub-period and level, the prediction unit 24 can obtain the value of each combination (sum of the probability values of the prediction models 30). For each of the sub-periods P41 to P45, the prediction unit 24 may acquire the level including the maximum value (or the level including the value equal to or greater than a predetermined threshold value) as the final prediction results, and notify the conveyance vehicle controller 12 of the final prediction results.

Still furthermore, in the example described above, the article (object to be conveyed) conveyed by the conveyance vehicle 2 is the FOUP in which semiconductor wafers are stored. However, the article is not limited thereto and, for example, the article may be another container in which glass wafers, reticles and the like are stored, or another article. Still furthermore, the location where the conveyance system 1 is installed is not limited to semiconductor manufacturing plants, and the conveyance system 1 may be installed in other facilities.

The invention claimed is:

1. A prediction device configured to predict a future state of a predetermined target area in a conveyance system that includes a conveyance path divided into a plurality of areas, a plurality of conveyance vehicles configured to convey an article by traveling along the conveyance path, and a conveyance vehicle controller configured to assign a transport command to each of the conveyance vehicles, the prediction device comprising:

a storage unit configured to store a prediction model that is trained by machine-learning to receive input data and output data, the input data being based on log information on at least one of an assignment state of the transport command and positions of the conveyance vehicles during a first period prior to a predetermined reference point in time, the output data indicating a prediction result of a degree of increase or decrease in number of conveyance vehicles in the target area during a second period subsequent to the reference point in time;

an acquisition unit configured to acquire data for prediction corresponding to the input data, based on the log information during a past period prior to a prediction execution point in time and has same length as that of the first period; and a prediction unit configured to acquire prediction information by entering the data for prediction acquired by the acquisition unit into the prediction model, the acquired prediction information indicating a prediction result of a degree of increase or decrease in number of conveyance vehicles in the target area during a future period subsequent to the prediction execution point in time and has a same length as that of the second period.

2. The prediction device according to claim 1, wherein the input data includes data indicating number of first conveyance vehicles observed during the first period, the data for prediction includes data indicating number of the first conveyance vehicles observed during the past period, and the first conveyance vehicle is the conveyance vehicle located in the target area.

3. The prediction device according to claim 1, wherein the input data includes data indicating number of second conveyance vehicles observed during the first period, the data for prediction includes data indicating number of the second conveyance vehicles observed during the past period, and the second conveyance vehicle is the conveyance vehicle traveling to a loading location in the target area based on the transport command.

4. The prediction device according to claim 1, wherein the input data includes data indicating number of third conveyance vehicles observed during the first period, the data for prediction includes data indicating number of the third conveyance vehicles observed during the past period, and the third conveyance vehicle is the conveyance vehicle traveling to an unloading location in the target area based on the transport command.

5. The prediction device according to claim 1, wherein the input data includes data indicating number of fourth conveyance vehicles observed during the first period, the data for prediction includes data indicating number of the fourth conveyance vehicles observed during the past period, and the fourth conveyance vehicle is the conveyance vehicle traveling to another area from the target area.

6. The prediction device according to claim 1, wherein the input data includes data indicating number of fifth conveyance vehicles observed during the first period, the data for prediction includes data indicating number of the fifth conveyance vehicles observed during the past period, and the fifth conveyance vehicle is the conveyance vehicle traveling to a specific point in the target area based on the transport command.

7. The prediction device according to claim 6, wherein the input data and the data for prediction include data indicating number of conveyance vehicles for each degree of proximity between an area in which the fifth conveyance vehicles are traveling and the target area, the number of conveyance vehicles being obtained by summing up the fifth conveyance vehicles for each degree of the proximity.

8. The prediction device according to claim 6, wherein the input data and the data for prediction further include data relating to speed of the fifth conveyance vehicle.

9. The prediction device according to claim 1, further comprising a model generation unit configured to generate the prediction model, wherein the model generation unit is configured to:

generate a plurality of pieces of teacher data by using each of a plurality of points in time different from each other as the reference point in time, the teacher data including the input data during the first period and a correct answer label indicating a degree of increase or decrease in the number of conveyance vehicles in the target area during the second period; and generate the prediction model by performing machine learning using the generated pieces of teacher data.

10. The prediction device according to claim 9, wherein the model generation unit is configured to:

set a plurality of levels according to a degree of increase or decrease in number of conveyance vehicles from a reference value by using number of conveyance vehicles in the target area at the reference point in time as the reference value; and generate a plurality of pieces of teacher data by using each of the points in time different from each other as the reference point in time, the teacher data including the input data during the first period and a correct answer label indicating the level to which an average number of conveyance vehicles in the target area during the second period belongs, and using number of conveyance vehicles in the target area at the prediction execution point in time as the reference value, the prediction unit acquires information as the prediction information by entering the data for prediction into the prediction model, the acquired information indicating a prediction result of the level to which average number of conveyance vehicles in the target area during the future period belongs.

11. The prediction device according to claim 10, wherein the model generation unit is configured to:

divide the second period into a plurality of sub-periods along a time series; and generate a plurality of pieces of teacher data by using each of the points in time different from each other as the reference point in time, the teacher data including the input data during the first period and a correct answer label indicating the level to which average number of conveyance vehicles in the target area in each of the sub-period belongs, and the prediction unit is configured to acquire information as the prediction information by entering the data for prediction into the prediction model, the acquired information indicating a prediction result of the level to which average number of conveyance vehicles in the target area in each of the sub-periods included in the future period belongs.

12. The prediction device according to claim 9, wherein the model generation unit is configured to generate the prediction model for each predetermined learning execution cycle, the model generation unit is configured to:

generate a plurality of pieces of teacher data by using each of a plurality of points in time included in a target period from a generation timing of a previous prediction model to a generation timing of a current prediction model as the reference point in time; and generate the current prediction model by performing machine learning using the generated pieces of teacher data, and the storage unit is configured to store the current prediction model generated by the model generation unit in association with the target period, without deleting the prediction model generated in past by the model generation unit.

13. The prediction device according to claim 12, wherein the prediction unit is configured to be able to select any of the prediction model to be used for prediction from a plurality of the prediction models stored in the storage unit.

14. The prediction device according to claim 13, wherein the prediction unit is configured to select the prediction model associated with most recent target period from the prediction models stored in the storage unit.

15. The prediction device according to claim 13, wherein the prediction unit is configured to select the prediction model associated with a past target period corresponding to a period including the prediction execution point in time from the prediction models stored in the storage unit.

16. The prediction device according to claim 1, wherein the prediction unit is configured to acquire the prediction information by performing a prediction process using the prediction model and notify the conveyance vehicle controller of the prediction information, for each prediction execution cycle that is shorter than the second period.

* * * * *